United States Patent [19]
Hiramatsu et al.

[11] Patent Number: 5,495,149
[45] Date of Patent: Feb. 27, 1996

[54] POWER SUPPLY

[75] Inventors: Akinori Hiramatsu, Ikoma; Hiroyuki Sako, Hirakata; Kazuhiro Gotoh, Hirakata; Nobukazu Miki, Hirakata, all of Japan; Seiji Soga, Santa Clara; Naokage Kishimoto, Sunnyvale, both of Calif.

[73] Assignee: Matsushita Electric Works, Ltd., Osaka, Japan

[21] Appl. No.: 65,247

[22] Filed: May 20, 1993

[51] Int. Cl.$^6$ .................................................. H05B 37/02
[52] U.S. Cl. ............... 315/209 R; 315/219; 315/DIG. 7
[58] Field of Search .................... 315/209 R, 210, 315/219, DIG. 5, DIG. 7, 223, 307

[56] References Cited

U.S. PATENT DOCUMENTS

| | | | |
|---|---|---|---|
| 4,127,795 | 11/1978 | Knoll | 315/210 |
| 4,392,087 | 7/1983 | Zansky | 315/219 |
| 4,553,070 | 11/1985 | Sairanen et al. | 315/209 R |
| 4,719,556 | 1/1988 | Wise | 363/56 |
| 4,906,901 | 3/1990 | Carroll | 313/219 |
| 5,015,923 | 5/1991 | Nilssen | 315/209 R |
| 5,072,155 | 12/1991 | Sakorai | 315/219 |
| 5,130,610 | 7/1992 | Kakitani | 315/219 |

*Primary Examiner*—Robert J. Pascal
*Assistant Examiner*—Darius Gambino
*Attorney, Agent, or Firm*—Kenyon & Kenyon

[57] ABSTRACT

A power supply for driving one or more loads includes a DC voltage source, an inverter connected to the DC voltage source for providing a high frequency AC voltage at its output end, and an output transformer having a primary winding and a secondary winding. The primary winding is coupled to the output end of the inverter through a tuning inductor, while the secondary winding is coupled to the load. A tuning capacitor, which constitutes a resonant circuit in cooperation with the resonance inductance for supplying a resonance current to the load, is connected across the secondary winding of the output transformer in parallel relation to the load. The tuning capacitor is arranged in circuit on the opposite side of the secondary winding from the load such that the tuning capacitor is open-circuited when the load is disconnected from the secondary winding.

16 Claims, 14 Drawing Sheets

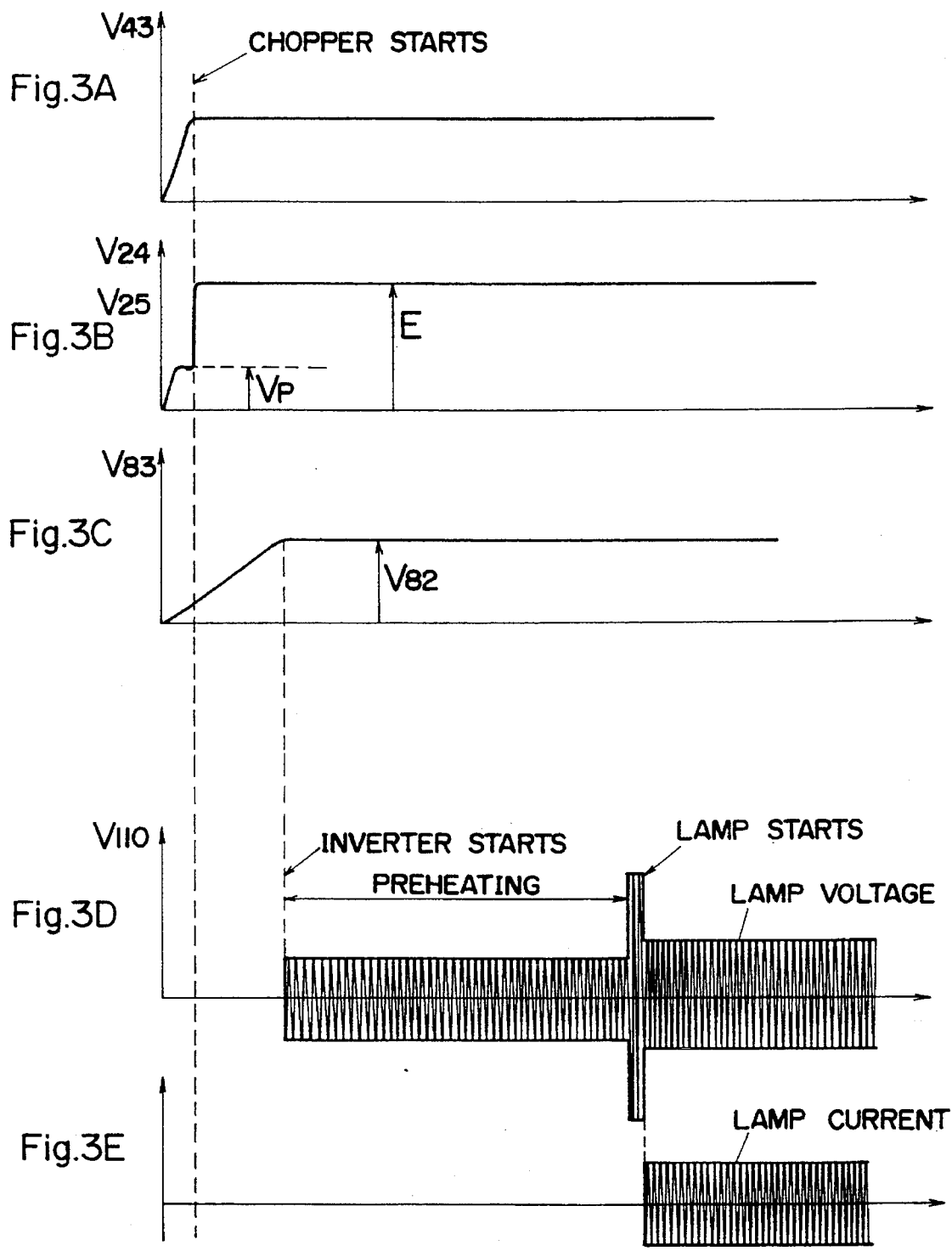

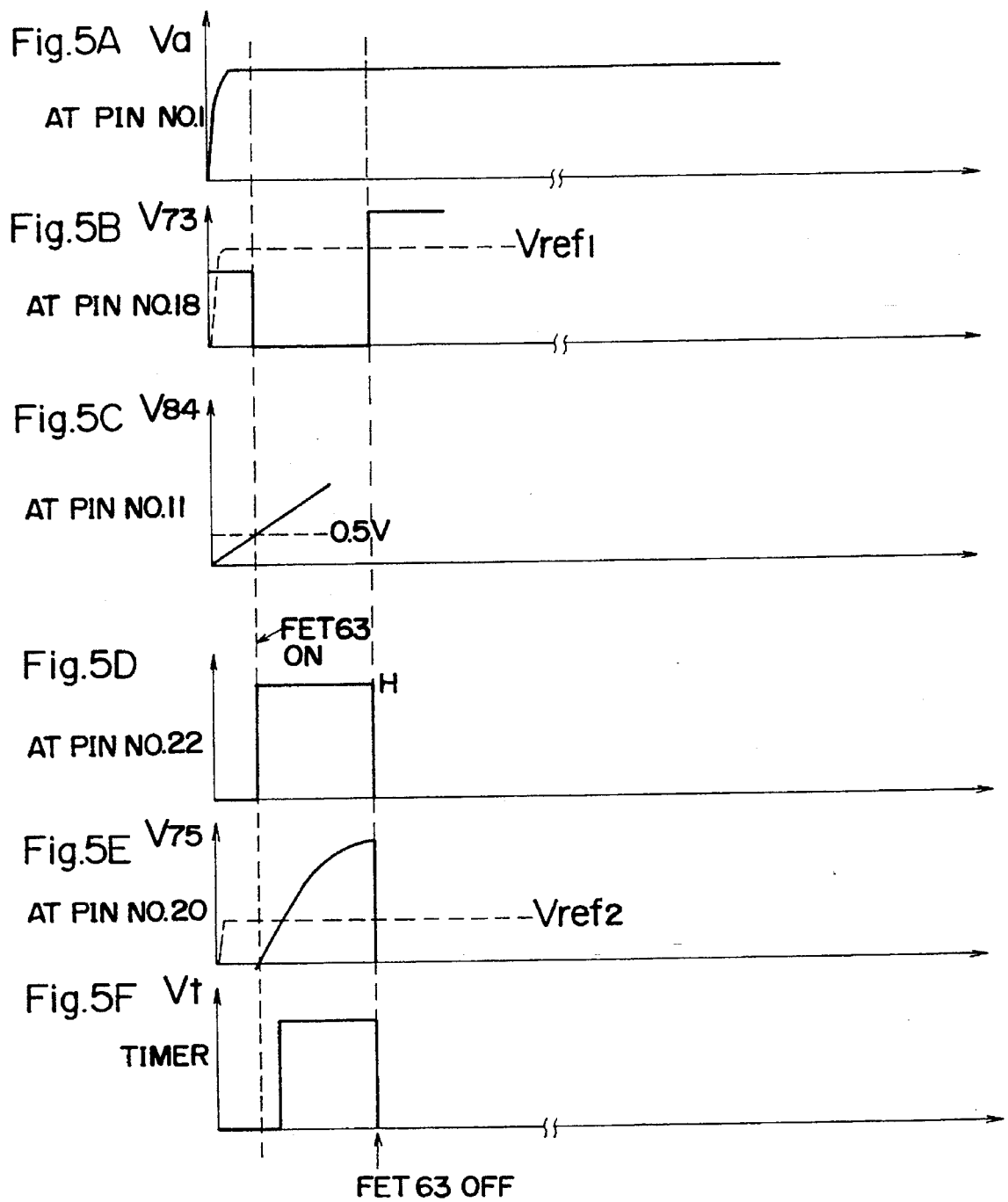

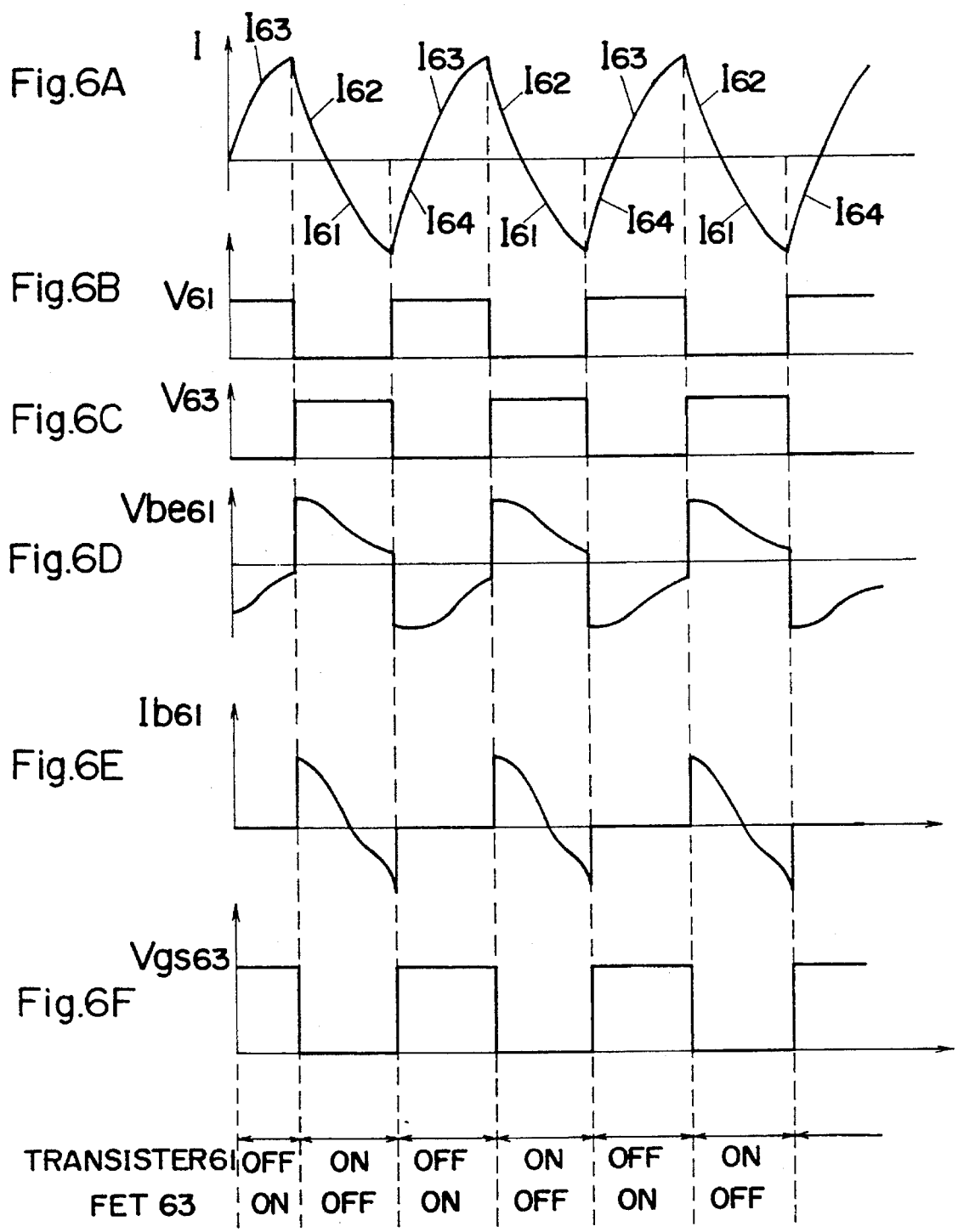

POWER SUPPLY

BACKGROUND OF THE INVENTION

1. Field of the Invention

The present invention is directed to a power supply, and more particularly to an inverter AC power supply which includes an output transformer to provide a high frequency resonance voltage for driving one or more loads, such as gas-discharge lamps.

2. Description of the Prior Art

An inverter AC power supply including an output transformer has been known in the art as disclosed in U.S. Pat. Nos. 4,719,556 and 5,130,610. The prior art power supply comprises an inverter providing a high frequency AC voltage to a primary winding of the output transformer and an L-C resonant circuit for providing a resonant current to a load which is coupled across a secondary winding of the output transformer. This prior art power supply is intended to limit, by the use of the output transformer, voltage appearing at receptacles or connection between an output end of the power supply and a load in order to avoid accidental electrical shocks even if personnel should touch electrode of the receptacle at the time of connecting the load to the power supply. The L-C resonant circuit is formed by a tuning capacitor connected across the primary winding and a tuning inductor connected in series with the primary winding. Since the tuning capacitor and inductor are both connected to the primary winding of the output transformer, there is a problem that, when the load is disconnected from the secondary winding, the L-C resonant circuit is kept active and therefore the circuit responds to act to operate the inverter at a high frequency near a resonant frequency of the L-C circuit in an attempt to provide a high starter voltage even in the absence of the load. This accompanies correspondingly increased resonant voltage and current in the circuit, which necessitates the use of circuit elements of high dielectric strength and capacity that are generally costly and bulky and are therefore not preferred in the design of the power supply. In order to avoid this problem, it is proposed to includes a clamping circuit to prevent undue increase of the resonant voltage in the absence of the load. However, the clamping circuit inherently adds circuit complexity and therefore cost to the power circuit. Another U.S. Pat. No. 4,392,087 discloses an inverter AC power supply for gas-discharge lamp which includes an inverter and a leakage output transformer having a primary winding connected to the output of the inverter and a secondary winding connected across a load or lamp. In this circuit, a tuning capacitor is connected in parallel with the load across the secondary winding and is cooperative with the leakage inductance on the secondary winding of the output transformer to form a resonant circuit on the side of the secondary winding for supplying a resonant current to the lamp. However, since the leakage transformer is inherently of bulky configuration, the power supply is difficult to be fabricated into a compact design. In the meanwhile, there is a potential problem for the inverter AC power supply in that a noise is inherently produced due to high frequency switching of the inverter, and in that a circuit board mounting the circuit component is likely to make a stray capacity between a conductor pattern of the board and a casing of the power supply. When the stray capacity becomes critical, the noise is easy to transmit back to the inverter input. Therefore, when the inverter is powered by a commercial AC line or power mains through a suitable AC-to-DC converter as is usual with the inverter AC power supply, the inverter may bring about a considerable noise problem on the power mains. In view of the above, the leakage inductance in the circuit of U.S. Pat. No. 4,392,087 is not expected to block the feedback noise, since the leakage inductance is located on the secondary winding of the transformer and not on the primary winding in direct electrical connection to the inverter.

SUMMARY OF THE INVENTION

The above problems have been eliminated in an improved power supply in accordance with the present invention. The power supply comprises a DC voltage source, an inverter connected to the DC voltage source for providing a high frequency AC voltage at its output end, and an output transformer having a primary winding and a secondary winding. The primary winding is coupled to the output end of the inverter through a tuning inductor, while the secondary winding is coupled to the load. A tuning capacitor, which constitutes an L-C resonant circuit in cooperation with the resonance inductance for supplying a resonance current to the load, is connected across the secondary winding of the output transformer in parallel relation to the load. [With the use of the output transformer for supplying the resonant current to the load, the power supply can isolate the output of the system from its input which is normally a power mains, whereby preventing the danger of exposing a high voltage at the electrodes of a receptacle for connection to the load and therefore avoiding an electrical shocks even if personnel should touch the electrode of a receptacle during the operation of attaching or detaching the load to and from the receptacle.] The tuning capacitor is arranged in circuit on the opposite side of the secondary winding from the load such that the tuning capacitor is open-circuited when the load is disconnected from the secondary winding. Therefore, upon removal of the load, the L-C resonant circuit ceases producing the resonant current to thereby prevent the circuit from producing increased voltage and current for protecting the circuit components from being damaged. Further, since the tuning inductor is connected in series with the primary winding, the tuning inductor can act also to block a feedback noise which results from a high frequency switching operation of the inverter and would be otherwise likely to be transmitted back to the input of the inverter in the presence of a stray capacity which is likely present between a conductor pattern of a board mounting the circuit component and a casing enclosing the circuit of the power supply.

Accordingly, it is a primary object of the present invention to provide an improved power supply which is capable of preventing over-voltage and current in the circuit when the load is removed for protection of the circuit components, and also capable of eliminating the feedback noise by best use of the tuning inductor.

The power supply is particularly useful for driving one or more discharge lamps. In this instance, the tuning capacitor is connected across the secondary winding through individual filaments of the discharge lamp so that the tuning capacitor is open-circuited when the discharge lamp is removed.

In a preferred embodiment in which the load is a gas-discharge lamp having a pair of filaments with connecting pins to be inserted into corresponding receptacles for electrical connection to the secondary winding of the output transformer, a switching device is provided to comprise at least one switch connected in circuit between one of the filament and the tuning capacitor and an actuator which is interlocked with the switch and projects on the receptacle to be movable between a closed circuit position of connecting the tuning capacitor to the secondary winding through the filament and an open circuit position of disconnecting the tuning capacitor from the secondary winding. The switch is accommodated within a housing of the receptacle with the actuator projecting in an abuttable relation to the discharge lamp such that the actuator abuts against the discharge lamp to be thereby moved into the open circuit position when the discharge lamp is mounted to the receptacle.

Preferably, the power supply includes a load detector for detecting condition of the load in terms of the voltage being supplied to the load through the output transformer and a control circuit which monitors the detected voltage and causes the inverter to limit its output voltage being supplied to the load through the output transformer when the monitored voltage exceeds a critical level. Thus, when the lamp becomes deteriorated to a condition near the end of its life with the attendant increase of the resistance and therefore voltage increase, the inverter responds to limit its output voltage in order to avoid producing over-voltage in the circuit which would otherwise occur to damage the circuit components.

It is therefore another object of the present invention to provide an improved power supply which is capable of protecting the circuit components from suffering over-voltage in response to the discharge lamp becoming deteriorated to be near the end of the life.

Further, the power supply may includes another load detector which detects whether the discharge lamp is kept connected to or disconnected from the output transformer and produces a disable signal when the discharge lamp is disconnected and producing an enable signal when the discharge lamp is connected to the output transformer. A control circuit is cooperative to the discharge lamp in such a manner as to disable and enable the inverter in response to the disable and enable signals, respectively. With this result, the power supply can be activated to provide a high starting voltage to the discharge lamp only when it is re-connected and be therefore prevented from providing the high starting voltage in the absence of the discharge lamp. This facilitates to re-start the power circuit, which is therefore a further object of the present invention.

In a preferred embodiment, a power supply is provided to drive a plurality of gas-discharge lamps. The power supply comprises, in addition to a like inverter connected to a like DC voltage source for providing a high frequency AC voltage at its output end, and a like output transformer having a primary winding coupled to the output end of the inverter through a tuning inductor and a single secondary winding coupled to the gas-discharge lamps, a plurality of tuning capacitors connected across the secondary winding in parallel relation to the discharge lamps. The tuning capacitors are cooperative with the tuning inductor on the side of the primary winding to form resonant circuits which produce a resonance current for driving the gas-discharge lamps. Also included in the power supply is a balancing choke coil with a primary winding connected in series between one of the two adjacent tuning capacitors and corresponding one of the discharge lamp. A secondary winding of the balancing choke coil is connected in series between the other of two the adjacent tuning capacitors and corresponding one of the discharge lamps. The primary and secondary windings of the balancing choke coil is arranged to have opposed polarity for equalizing the currents flowing through the adjacent two tuning capacitors for successfully starting the plurality of discharge lamps irrespective of possible difference in starting voltages of the lamps, which is therefore a further object of the present invention.

The present invention discloses a further modified power supply for driving a plurality of discharge lamps which comprises, in addition to a like inverter connected to a like DC voltage source for providing a high frequency AC voltage at its output end, an output transformer with a primary winding coupled to the output end of the inverter through a tuning inductor and a plurality of secondary windings respectively coupled to a plurality of discharge lamps each having two filaments. A plurality of tuning capacitors are connected across the secondary windings of the output transformer, respectively in parallel relation to corresponding one of the lamps with each tuning capacitor connected across the two filaments of each discharge lamp. Each of the tuning capacitors is cooperative with the tuning inductor to form a resonant circuit which produces a resonance current for driving the corresponding lamp. Also, each of the tuning capacitors is connected across each of the secondary windings through the filaments of each lamp such that the tuning capacitor is open-circuited when the discharge lamp is disconnected from the secondary winding. Each of the discharge lamps is connected in series with a current limiting element across each of the secondary winding in order to successfully provide a suitable starting voltage to the individual lamps and to stably provide a suitable operating voltage thereto, which is therefore a more object of the present invention.

In addition, a plurality of voltage detectors are connected respectively across the discharge lamps for detecting voltages being applied to the corresponding lamps. A safe circuit is connected to the voltage detectors to monitor the detected voltages and controls the inverter to decrease its output voltage being applied to the corresponding lamps when the detected voltage in any one of the voltage detectors exceeds all acceptable level. Consequently, the inverter is well prevented from producing over-voltage to the discharge lamps when any one of the lamps is detected to receive an abnormally high voltage, which is therefore a still more object of the present invention.

In this circuit configuration, it is preferred that the discharge lamps are connected in such a manner that one of the two filaments of the individual discharge lamps are commonly connected to a common line, and that the safety circuit has two inputs one of which is connected to the common line. With this arrangement, only a single safety circuit is sufficient to detect abnormal high-voltage being applied in any one of the lamps for limiting the output of the inverter, thereby simplifying the circuit, which is therefore a still more object of the present invention.

These and still other objects and advantages will become more apparent from the following description of the preferred embodiments when taken in conjunction with the attached drawings.

BRIEF DESCRIPTION OF THE DRAWINGS

FIG. 3, composed of FIGS. 3A to 3E, is a waveform chart illustrating the operation of the circuit of FIG. 2;

FIG. 5, composed of FIGS. 5A to 5F, is a waveform chart illustrating the operation of an inverter in the circuit of FIG. 2;

FIG. 6, composed of FIGS. 6A to 6F, is a waveform chart illustrating the operation of the inverter in the circuit of FIG. 2;

DETAILED DESCRIPTION OF THE PREFERRED EMBODIMENTS

Figure 1:
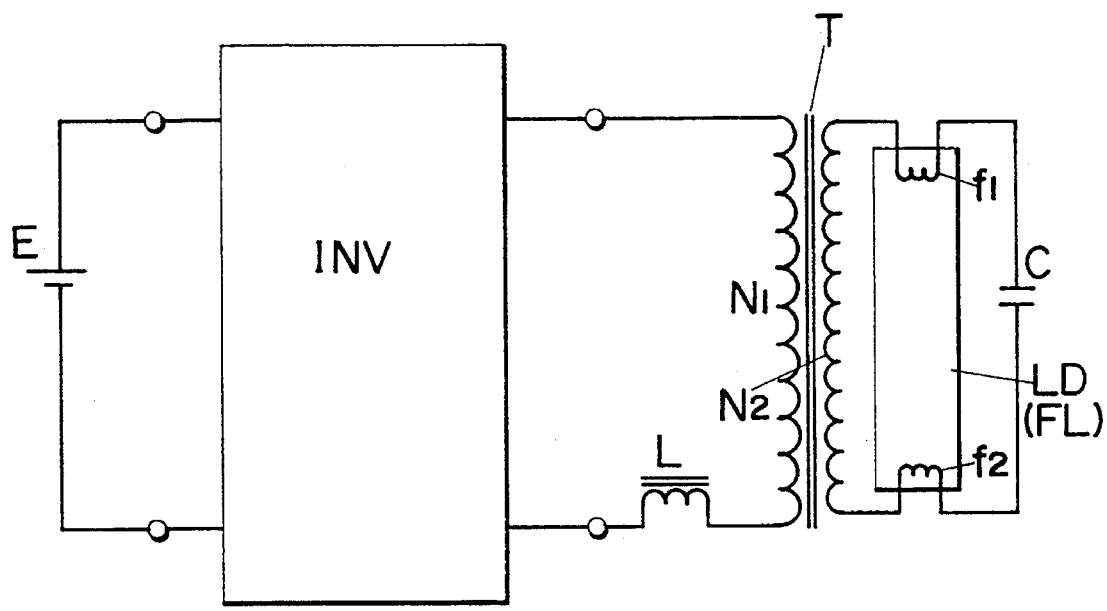
FIG. 1 is a schematic diagram illustrating a basic circuit of a power supply of the present invention.

Referring now to FIG. 1, a basic circuit diagram of a power supply in accordance with the present invention is shown to comprise an inverter INV connected to a DC voltage source E to provide therefrom a high frequency alternating voltage at its output end, an output transformer T having a primary winding $N_1$ and a secondary winding $N_2$. The primary winding $N_1$ is connected across the output end of the inverter INV through a tuning inductor L. A load LD is connected across the secondary winding $N_2$ in a parallel relation to a tuning capacitor C. The capacitor C on the side of the secondary winding $N_2$ is cooperative with the inductor L on the side of the primary winding $N_1$ to form a series-resonant L-C circuit which provides a resonant current to the load LD while the inverter INV produces the high frequency voltage to the primary winding $N_1$ of the output transformer T. The load LD is shown to be a gas discharge lamp FL such as a fluorescent lamp having a pair of filaments $f_1$ and $f_2$ through which the tuning capacitor C is connected across the secondary winding $N_2$ such that when the load LD is disconnected from the secondary winding $N_2$, the tuning capacitor C becomes open-circuited. Whereby the L-C resonant-circuit ceases producing the resonant current, which in turn prevents the inverter INV from producing over-voltage in an attempt to give a starting voltage even in the absence of the load LD, and therefore protects the circuit components from such over-voltage. Otherwise or the L-C resonant circuit should be kept active in the absence of the discharge lamp, the inverter INV utilized in the power supply for the discharge lamp would respond to operate at around a resonant frequency and therefore would be most likely to produce the over-voltage and over-current in the inverter circuit.

FIRST EMBODIMENT <FIGS. 2 TO 9>

A power supply in accordance with a first embodiment of the present invention will be now discussed in detail with reference to a circuit diagram of FIG. 2. The power supply is composed basically of a low-pass filter 10 connected to an AC mains, a full-wave rectifier 16, chopper 20, a chopper controller 40, an inverter 60, an inverter controller 80, and an output transformer 100 with a primary winding 101, a main secondary winding 102, auxiliary secondary windings 103 and 104. The primary winding 101 is connected across an output end of the inverter 60 to receive a high frequency AC voltage therefrom. The secondary winding 102 is connected to drive a pair of series connected fluorescent lamps $FL_1$ and $FL_2$ having a pair of filaments $f_1$, $f_2$ and $f_3$, $f_3$, respectively. A tuning capacitor 110 is connected across the secondary winding 102 in parallel relation to the series combination of the lamps $FL_1$ and $FL_2$, and is cooperative with a tuning inductor 66 connected to the primary winding 101 to form a series L-C resonant circuit which supplies a resonant current for driving the lamps $FL_1$ and $FL_2$. The tuning capacitor 110 is connected to the secondary winding 102 through filaments $f_1$ and $f_3$ so that it is open-circuited when either of the lamps $FL_1$ or $FL_2$ is removed. The auxiliary secondary winding 103 is connected in series with a capacitor 111 between the filaments $f_2$ and $f_3$ for preheating the filaments $f_2$ and $f_3$, while the main secondary winding 102 acts to preheat the filaments $f_1$ and $f_3$ through the tuning capacitor 110. Also included in the power supply are a lamp life detector 120 and a re-starter 130 connected to the auxiliary secondary winding 104.

Individual sub-circuits of the power supply will be now discussed with reference to FIG. 2.

The low-pass filter 10 is composed of a zinc oxide non-linear resistor (ZNR) 11, inductors 12 and 13, and capacitor 14 and 15 so as to pass a current at a low frequency of the AC mains but inhibit a high frequency current due to high frequency switching operation at the chopper 20, thereby preventing the high frequency noise from leaking into the AC mains. Also, the low-pass filter 10 acts to average the high frequency current flowing into the chopper 20 for providing thereto an input current which is sinusoidal nearly in phase with the AC voltage of the AC mains for reducing the high frequency components in the input current. The AC voltage is applied through the low-pass filter 10 to the full-wave rectifier 16 in the form of a diode bridge at which it is rectified into pulsating voltage.

The chopper 20 is provided to repetitively interrupt the pulsating voltage from the fill-wave rectifier 16 to provide a smoothed DC voltage to the inverter 60. The chopper 20 comprises an inductor 21, a power MOSFET 22, a blocking diode 23, and a series pair of smoothing capacitors 24 and 25. MOSFET 22 is driven by the chopper controller 40 to alternately turn on and off at a high frequency so as to repeat storing electromagnetic energy into the inductor 21 by the current flowing from the rectifier 16 upon being turned on and releasing energy in the form of an induced voltage from the inductor 22 upon being turned off. The induced voltage is added to the output voltage of the rectifier 16 and is applied through diode 23 into the capacitors 24 and 25 to develop an increased and smoothed DC voltage across the capacitors 24 and 25.

The chopper controller 40 comprises an application specific IC 41 available from Unitrode Inc as "IC UC3852" and associated circuit components in order to monitor a current flowing through the chopper 20 as well as an output voltage of the chopper for controlling the MOSFET 22 based thereon.

Figure 7:
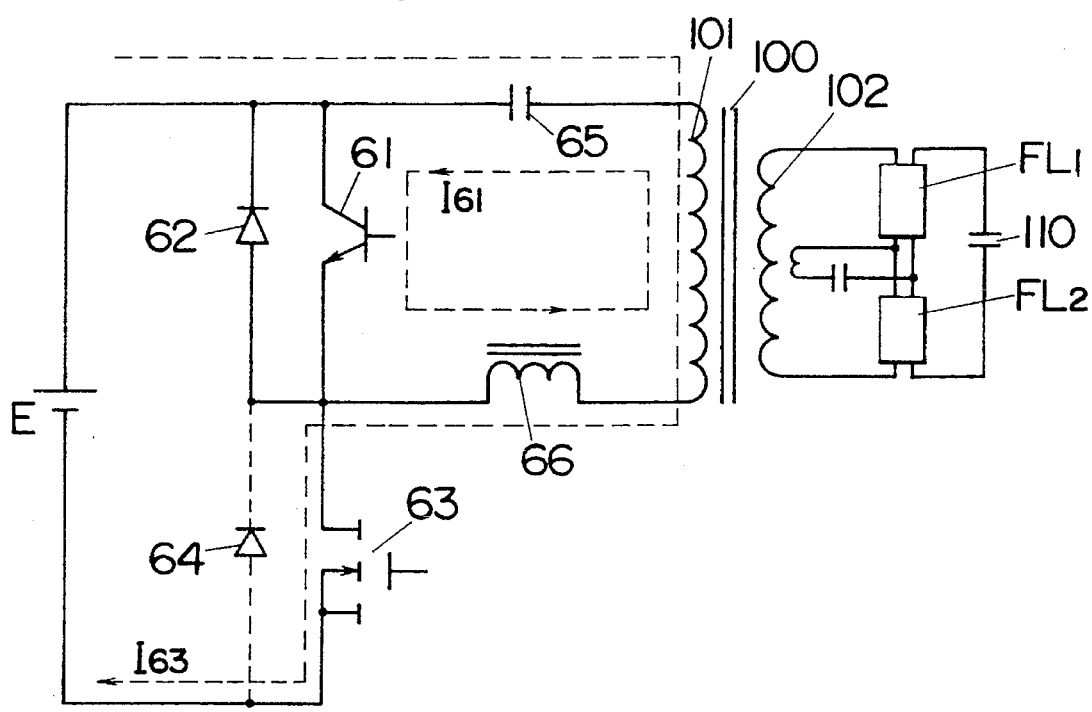
FIGS. 7 to 9 are circuit diagrams illustrating the operation of the circuit of FIG. 2.
Figure 8:
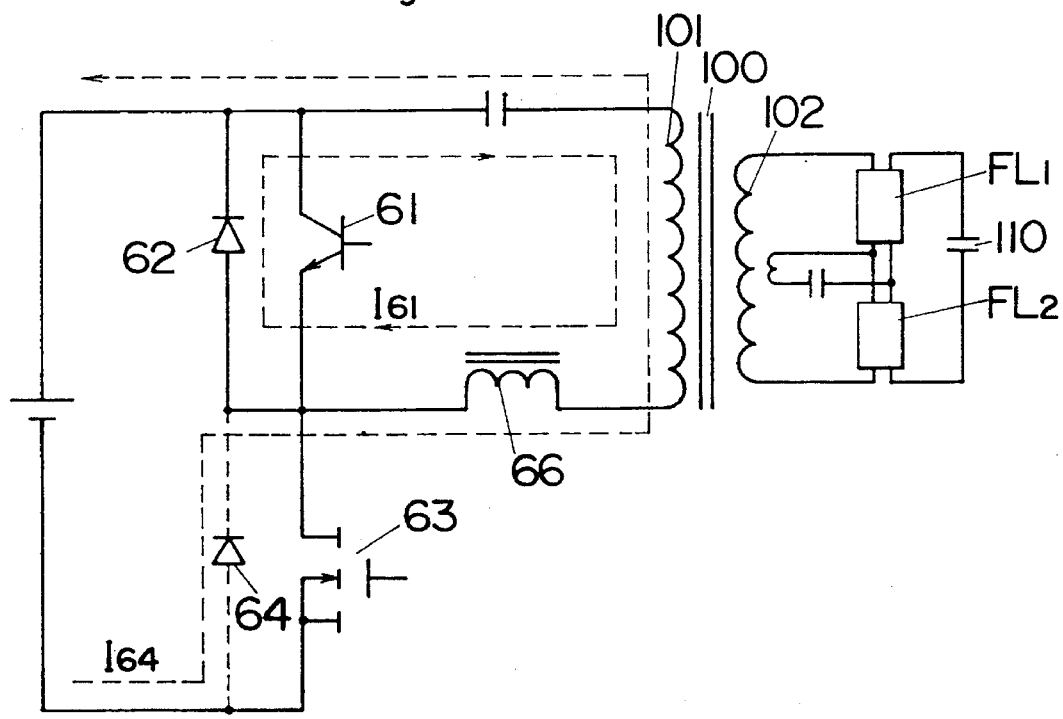

The inverter 60 comprises a bipolar power transistor 61, a diode 62 anti-parallel with transistor 61, power MOSFET 63 having a parasitic diode 64 (only shown in FIGS. 7 and 8), and a capacitor 65, and is coupled through a tuning inductor 66 to the primary winding 101 of the output transformer 100. The capacitor 65 is connected between a collector of transistor 61 and the one end of the primary winding 101. Resistors 68 and 69 are connected across the capacitor 65. The tuning inductor 66 is magnetically coupled to a secondary winding 67 which is connected between base-emitter path of transistor 61. The transistor 61 and MOSFET 63 are driven to alternately turn on and off under the control of the inverter controller 80 so as to provide an alternating voltage at a frequency of about 22 to 50 kHz to the primary winding 101 of the transformer, thereby supplying a corresponding electric power to the lamps $FL_1$ and $FL_2$ through the output transformer 100. The inductor 66 on the side of the primary winding 101 is cooperative with the tuning capacitor 110 on the side of the secondary winding 102 to form the series L-C resonant circuit which supplies a resonant current to the lamps $FL_1$ and $FL_2$ from the electric power produced by the inverter 60.

The inverter controller 80 comprises an application specific IC 81 available from Matsushita Electric Components, Co., Ltd. as "IC AN6766K" and associated circuit components for starting the inverter 60, pre-heating the lamps $FL_1$ and $FL_2$, and varying an operating frequency of inverter 60. The inverter frequency is controlled to vary the on-time period of the MOSFET 63. The on-time period of MOSFET 63 starts immediately after turn-off of the transistor 61, which is detected at the inverter controller 80 when the parasitic diode of MOSFET 80 becomes conductive. The IC 81 receives its operating voltage from a voltage source composed of a dividing resistor 26, a zener diode 82, and a capacitor 83.

The lamp life detector 120 is provided to detect a considerable voltage increase developed at the inverter output as a consequence of that the lamp becomes deteriorated to its end of operating life with attendant increase in resistance, and is utilized to limit the inverter output voltage when the detected voltage exceeds a critical level for the purpose of protecting the inverter circuit from otherwise developed over-voltage.

The re-starter 130 is provided to disable the inverter 60 when either of the lamps are removed and restart the inverter 60 to give a starting voltage to the lamps when the lamps are re-connected. The operations of the lamp life detector 120 and the re-starter 130 will be discussed in detail hereinafter.

CHOPPER OPERATION

Figure 4A:
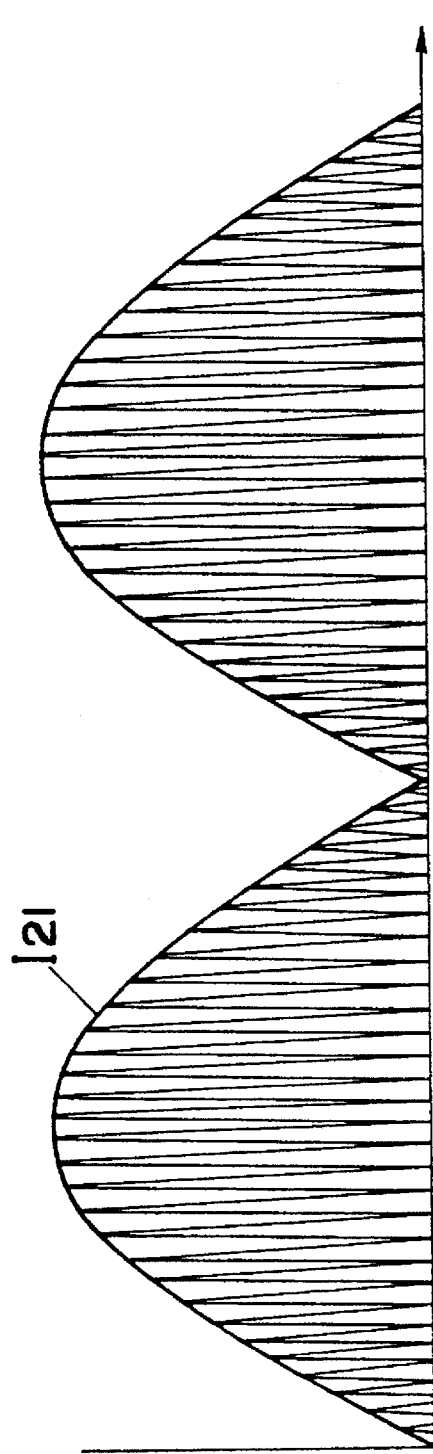
FIGS. 4A and 4B are diagrams illustrating current flowing through an inductor of a chopper in the circuit of FIG. 2 and an input current from an AC power mains to the same circuit.
Figure 4B:
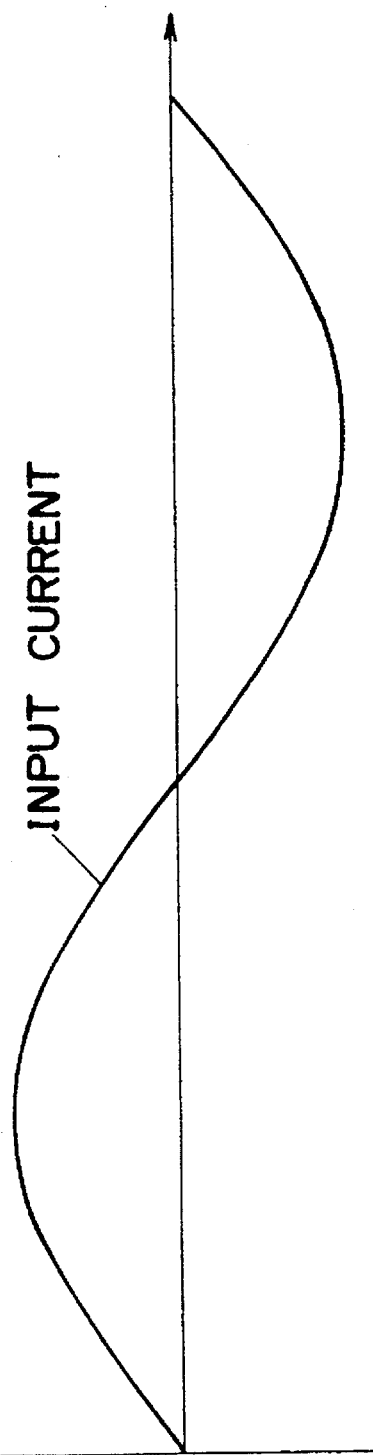

When the circuit is connected to the AC mains, the IC 41 of the chopper controller 40 becomes charged with the rectified voltage from the rectifier 16 through a resistor 42 and a capacitor 43. When the capacitor 43 is charged up to have an increasing operating voltage $V_{43}$ greater than about 15 V, as shown in FIG. 3A, the IC 41 responds to issues a control signal at a control terminal (pin no.6) for turning on MOSFET 22 for a limited period, thereby starting the chopper controller 40. After the start of the chopper controller 40, the IC 41 is kept powered by a voltage applied to a power terminal (pin no.1), which voltage is charged in the capacitor 43 from a current induced at a secondary winding 44 coupled to the inductor 21 and flowing through a diode 45. The on-time period of MOSFET 22 is determined by a resistor 46 connected to a terminal (pin no.3), a capacitor 47 connected to a terminal (pin no.4), and a voltage at a feedback terminal (pin no.1) which receives the output voltage of the chopper divided by resistors 27 and 28, and a variable resistor 29. Subsequent turning on of MOSFET 22 is made by the control signal produced from the terminal (pin no.6) at a timing which is determined by a voltage developed across a resistor 30 and applied to a terminal (pin no.2). The voltage applied to the terminal (pin no.2), which is indicative of a current flowing through the circuit of the chopper 20 and is made negative relative to a ground level of the inverter circuit, is compared with a reference level within the IC 41 in such a manner to judge whether the inductor 21 has released its energy to give substantially zero current. Upon acknowledging this occurrence, the IC 41 responds to issue the control signal from the terminal (pin no.6) for turning on the MOSFET 22 for the time period as determined in the above. In this manner, MOSFET 22 is controlled to turn on and off at a high frequency of about 40 to 100 kHz in a feedback manner for developing across the capacitors 24 and 25 the smoothed DC voltage E which, as shown in FIG. 3B, is higher than a peak voltage $V_p$ of the AC mains and is kept constant irrespective of variations in the input voltage from the AC mains. Resistors 31 and 32 are provided respectively for limiting a gate current to MOSFET 22 and for preventing malfunction of MOSFET 22. IC 41 is also provided with an offset terminal (pin no.8) which is connected to the feedback terminal (pin no.1) through a resistor 48 and a capacitor 49 so as to provide an offset for an internal operational amplifier in IC 41. With this operation of the chopper 20, the inductor 21 sees a saw-teeth like high frequency current $I_{21}$ with no quiescent time, as shown in FIG. 4A. This high frequency current is averaged through the low-pass filter 10 to give an sinusoidal input current which, as shown in FIG. 4B, is nearly in phase with the AC line voltage from the AC mains, thereby improving power factor with the reduction of the high frequency components.

INVERTER OPERATION

At the inverter controller 80, the capacitor 83 at the inverter controller 80 is charged through the resistor 26 to give to a power terminal (pin no.1) of the IC 81 an operating voltage, the upper end of which is limited by the zener diode 82, as shown in FIG. 3C. When the operating voltage increases up to about 10 V, the IC 81 is enabled to turn on the MOSFET 63. It is noted here that the IC 81 is enabled in a delayed manner after the energization of the IC 41 by suitably selecting time constants; of resistor 26 and capacitor 83 in relation to resistor 42 and capacitor 43 in the chopper controller 40, as shown in FIGS. 3A and 3C. The MOSFET 63 is controlled to turn on for a limited time period determined by the IC 81. Upon turn-off of MOSFET 63, the transistor 61 responds to turn on instead for another limited time period determined by circuit components of the inverter 60, after which MOSFET 63 is controlled to again turn on. In this manner, MOSFET 63 and transistor 61 are controlled to alternately turn on and off at a varying high frequency within a range of about 22 to 50 kHz to provide a high frequency voltage to the lamps $FL_1$ and $FL_2$ through the output transformer 100 and the L-C resonant circuit. During the initial cycles, the inverter 60 is caused to operate at a high frequency of, for example, 28 kHz which is greater than a resonant frequency, for example, about 22 kHz of the L-C resonant circuit in order to provide to the lamps a preheating voltage, which is lower than a starting voltage, as shown in FIG. 3D, for preheating the filaments $f_1$ to $f_3$ thereof. During this preheating period which is determined by capacitance of a capacitor 84, the filaments $f_1$ and $f_3$ are heated through the tuning capacitor 110 by the voltage from the secondary winding 102 while the filaments $f_2$ and $f_3$ are heated by the auxiliary secondary winding 103 through the capacitor 111 which is provided to prevent over-current from flowing in case that the filaments or the transformer becomes short-circuited. After the preheating which is normally done within about one second from the start of the power supply, MOSFET 63 is then controlled to have a prolonged turn-on period. Whereby, the inverter 60 operates at a high frequency of about 22 to 23 kHz near the resonant frequency of the L-C circuit to provide an increased voltage for starting the lamps $FL_1$ and $FL_2$, after which the inverter 60 is kept operated at substantially the same frequency for providing a lamp current to keep the lamps on.

More detailed inverter operation will be now explained with reference to time charts of FIGS. 5A to 5F in which FIGS. 5A to 5E show voltages supplied respectively to the power terminal (pin no.1) of IC 81 from capacitor 83, to a voltage monitor terminal (pin no.18), to a terminal (pin no. 11), to an output terminal (pin no. 22), to a current sensing terminal (pin no.20), and FIG. 5F shows an output voltage from an internal timer of IC 81. As the operating voltage $V_a$ supplied to power terminal (pin no.1) increases, as shown in FIG. 5A, the IC 81 will responds to create a reference voltage $V_{ref1}$ which, as shown by dotted lines in FIG. 5B, will be later discussed with reference to the operation of MOSFET 63. Immediately after the start of the chopper 20, both of the transistor 61 and MOSFET 63 are kept turned off, during which the output voltage of the chopper 20 is applied across resistors 68 and 69 as well as across source-drain path of MOSFET 63. The resulting source-drain voltage $V_{ds}$ of MOSFET 63 is divided by resistors 71 to 73 so as to provide across the resistor 73 a voltage $V_{73}$ which is supplied to the terminal (pin no.18), as shown in FIG. 5B. When the voltage $V_{84}$ of capacitor 84 supplied to the terminal (pin no. 11) increases up to about 0.5 V with the voltage across the resistor 73 being lower than the reference voltage $V_{ref1}$, as shown in FIGS. 5B and 5C, the IC 81 responds to produce at the terminal (pin no. 22) a high-level output, as shown in FIG. 5D. The high-level output is fed through a resistor 74 to give a starting pulse to a gate of MOSFET 63 for turning it on, at which condition the transistor 61 is kept turned off. Upon turn-on of MOSFET 63, the inverter 60 operates to flow a current through capacitor 65, primary winding 101 of output transformer 100, tuning inductor 66, MOSFET 63, and a resistor 75 with attendant increase in voltage $V_e$ [$V_{75}$] across the resistor 75, which voltage is supplied to the current sensing terminal (pin no.20) of IC 81. As shown in FIG. 5E, when voltage $V_{75}$ exceeds another reference voltage $V_{ref2}$ formed internally of IC 81, the internal timer of IC 81 is activated to provide a high level timer output $V_t$, as shown in FIG. 5F, for a limited time interval determined by a time constant of an externally accessible variable resistor 85, a fixed resistor 86 and a capacitor 87 which are connected to a terminal (pin no.2) of IC 81. It is noted here that the timer acts to prolong the on-time period of MOSFET 63 than that obtained by the starting pulse. In other words, MOSFET 63 is turned on only for a short time period when the timer is disabled. When the timer output $V_t$ goes low after elapse of the predetermined time interval, the IC 81 responds to produce a low-level output at terminal (pin no.22) for turning off MOSFET 63. While MOSFET 63 is turned on, the secondary winding 67 coupled to the tuning inductor 66 induces a voltage which is applied as a reverse bias to keep the transistor 61 turned off. On the other hand, when MOSFET 63 is turned off, the secondary winding 67 induces an opposite voltage which forward biases transistor 62 to turn it on. Thus, the inverter 60 starts providing an oscillating current or voltage.

The above and subsequent operation of the inverter is explained with reference to the waveform chart of FIGS. 6A to 6F. FIG. 6A shows an oscillating current flowing through the tuning inductor 66 wherein $I_{61}$ indicates a collector current to transistor 61, $I_{63}$ indicates a drain current to MOSFET 63, $I_{62}$ indicates a current through diode 62, and $I_{64}$ indicates a current through the parasitic diode of MOSFET 63. FIGS. 6B to 6F show a collector-emitter voltage $V_{61}$ of transistor 61, a drain-source voltage $V_{63}$ of MOSFET 63, a base-emitter voltage $V_{be61}$ of transistor 61, a base current $I_{b61}$ of transistor 61, and a gate-source voltage $V_{gs63}$ of MOSFET 63, respectively. When MOSFET 63 is turned off to cease the drain current $I_{63}$, the inductor 66 acts to flow a current continuously in the same direction while the secondary winding 67 of the inductor 66 induces the opposite voltage. The resulting current is allowed to flow through diode 62 as the current $I_{62}$, as indicated by dotted lines in FIG. 8. At which occurrence, transistor 61 is forward biased by the opposite voltage induced at winding 67, as shown in FIG. 6D, to be thereby turned on. When the current $I_{62}$ drops to zero, the capacitor 65 acts as a voltage source to provide the collector current $I_{61}$ to transistor 61, as indicated by dotted line in FIG. 7. After the collector current $I_{61}$ reaches $\beta$ times the base current, transistor 61 becomes unsaturated. With this result, the induced voltage at the winding 67 is reduced to decrease the base current to transistor 61 to such a level insufficient as to keep the transistor 61 turned on, whereby transistor 61 is turned off. Even after transistor 61 is turned off, the inductor 66 acts to continuously flow the current $I_{64}$ in the same direction through the primary winding 101, DC voltage source E at the output end of the chopper 20, and the parasitic diode 64 of MOSFET 63, as indicated by dotted lines in FIG. 8. When the parasitic diode 64 becomes conductive, the source-drain voltage $V_{63}$ drops to zero with attendant decrease in voltage $V_{73}$ supplied to the voltage monitor terminal (pin no.18). Consequently, the voltage across the resistor 73 goes below the internal reference voltage $V_{ref1}$ in response to which IC 81 produces the high-level output at the output terminal (pin no.22) so as to turn on MOSFET 63, thereby flowing the drain current $I_{63}$, as indicated by dotted line in FIG. 7. After the drain current $I_{63}$ start flowing in the circuit, there appears across the resistor 74 a resulting voltage which is supplied to the current sensing terminal (pin no.20) of IC 81 to be compared with the reference voltage $V_{ref2}$. Then, when the voltage goes above the reference voltage $V_{ref2}$, the internal timer of IC 81 is activated for the predetermined time period which determines the on-time period of MOSFET 63, and after which IC 81 controls to turn off MOSFET 63. In this manner, MOSFET 63 and transistor 61 are controlled to alternately turn on and off at the high frequency to drive the lamps through the output transformer 100 and the L-C resonant circuit composed of the inductor 66 and the capacitor 110. Operation of the lamp life detector 120.

In near the end of the lamp life, the lamp requires increase lamp current with attendant increase in the lamp voltage, at which condition the inverter 60 responds to increase the output voltage. Upon this occurs, the auxiliary winding 104 of the output transformer 100 shows an increased induced voltage which in turn develops an increase voltage across a resistor 121 connected in series with the auxiliary winding 104 through diode 122 and resistor 123. The voltage across the resistor 121 is input to a terminal (pin no.15) of IC 81 where it is compared with a threshold level, for example, about 5 V determined internally of IC 81. When the voltage of resistor 121 exceeds the threshold level, IC 81 responds to provide at the output terminal (pin no.22) the low-level output of turning off MOSFET 63 or the high-level output with limited time intervals, to thereby stop oscillating the inverter or limit the output voltage to the lamps. Therefore, with the addition of the lamp-life detector 120, the IC 81 can acknowledge the near the end of lamp life condition at which the lamp voltage increases as analogous with no load condition, and stop or limit the inverter operation for protecting the circuit components from otherwise developing over-voltage. In particular, transistor 61 and MOSFET 63 are protected from being damaged by such over-voltage and inductor 66 and primary winding 101 are prevented from suffering from being excessively heated due to the over-voltage.

OPERATION OF THE RE-STARTER 130

When either of lamps $FL_1$ or $FL_2$ is removed for replacement with the power supply kept energized, the tuning capacitor 110 is open-circuited to cease operating the inverter 60. That is, as the capacitor 110 is open-circuited to break the L-C resonant circuit, the secondary winding 102 is also open-circuited with an attendant inductance increase of the primary winding 101, which in turn reduces the current flowing through the inductor 66 and fails to develop sufficient forward bias to the base of transistor 61, whereby disabling transistor 61 and therefore MOSFET 63. If this condition should remains, a personnel would be forced to re-start or re-energize the power supply each time the replacement of the lamp is done. This inherently involves the preheating of the lamps and therefore causes a delay in lighting the lamps. However, with the addition of the re-starter 130 in the circuit of the power supply, no such operation is necessary on the side of the personnel for the reason below. The re-starter 130 comprises a bipolar transistor 131 connected across the output end of the full-wave rectifier 16 with its collector connected through a resistor 132 to resistor 26 by way of connection indicated at P in FIG. 2, and also with the collector connected to terminal (pin no.12) of IC 81. The base of transistor 131 is connected through resistors 133 and 134 to the drain of MOSFET 63, while a capacitor 135 is connected between base-emitter path of transistor 131, and is also connected in series with resistors 133 and 134 across MOSFET 63. When the inverter 60 is operating to provide the high frequency voltage, the capacitor 134 is constantly charged from the current alternately through transistor 61 and primary winding 101 and commonly through resistors 133 and 134 so as to provide a forward bias to keep transistor 131 turned on, at which condition the terminal (pin no.12) receives a low-level input. When the inverter 60 stops to turn off both of transistor 61 and MOSFET 63 due to the open-circuiting of the tuning capacitor 110 as a result of removal of the lamp, the capacitor 134 is firstly charged by a current flowing from the output of the chopper 20 through resistors 68, 69, 133, and 134 up to a forward bias for turning on transistor 131. As a consequence of that transistor 131 is turned on, the capacitor 134 is discharged and is again charged by the current through the above path. In this manner, the capacitor 134 repeats charging and discharging to thereby give to terminal (pin no.12) repeating high-level and low-level inputs. IC 81 is designed to provide at the output terminal (pin no.22) the starting pulse of turning on MOSFET 63 for the limited time interval each time the high level input appears at the terminal (pin no.12). It should be understood in this connection that when the lamp is removed to or in the no-load condition with the L-C resonant circuit broken to open-circuit the secondary winding 102, the primary winding 101 and the inductor 66 (?, please correct) acts to limit the current flowing through MOSFET 13. Therefore, the voltage across the resistor 73 will not increase up to the reference voltage $V_{ref2}$ so that the timer is not activated to prolong the on-time period of MOSFET 63 sufficient to start the oscillation of the inverter 60. In this sense, after the lamp is removed, the IC 81 responds to be constantly reset to be ready for restarting the inverter 60 while repeating to turn on and off MOSFET 63 with the transistor 61 being kept turned off. As soon as the lamp is installed, the voltage across resistor 74 will increase above the reference voltage $V_{ref2}$ to thereby activate the timer to prolong the on-time period of MOSFET, which in turn cause transistor 61 to subsequently turn on in the manner discussed in the above, thereby resuming the inverter operation of providing the high frequency voltage to the lamps.

Figure 9:
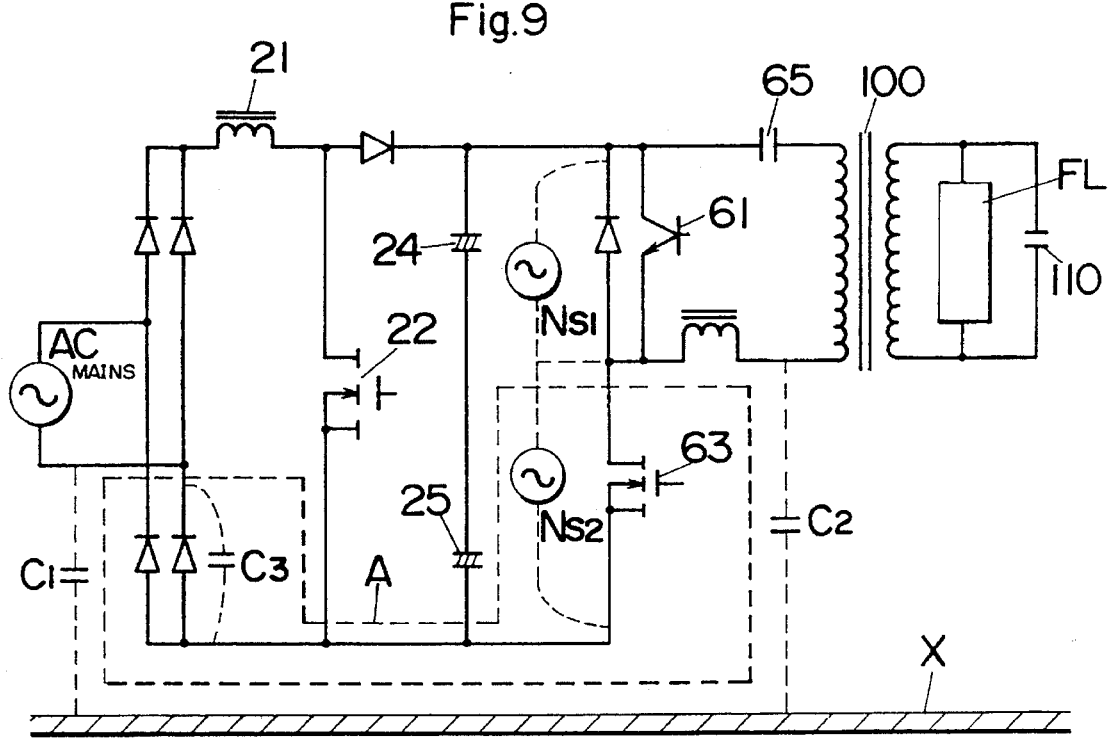

In the meanwhile, when a printed board mounting the components forming the above circuit of power supply is encased within a casing X, stray capacities $C_1$ and $C_2$ are likely to made between conductive patterns on the board and the casing in addition to another stray capacity $C_3$ across the diodes of rectifier, as shown in FIG. 9. The resulting stray capacities $C_1$ to $C_3$ will constitute a closed loop (as indicated by dotted lines A in the figure) which extends from the inverter 60 toward the AC mains. With the presence of such stray capacities, noises $N_{S1}$ and $N_{S2}$ generating at transistors 61 and 63 due to the high frequency switching thereof are easy to be fed back to the AC mains. Such feedback noise give undesired influence on other electrical devices on the AC power line and should be eliminated. Nevertheless, in the present invention in which the L-C resonant circuit is formed by the inductor 66 on the side of the primary winding 101 and the tuning capacitor 110 on the side of the secondary winding, the inductor 66 is located within the above loop A and is best utilized to block the noises from being fed back outwardly of the loop toward the AC mains. In other words, the inductor 66 can act as a noise filter to eliminate the above problem.

Figure 2:
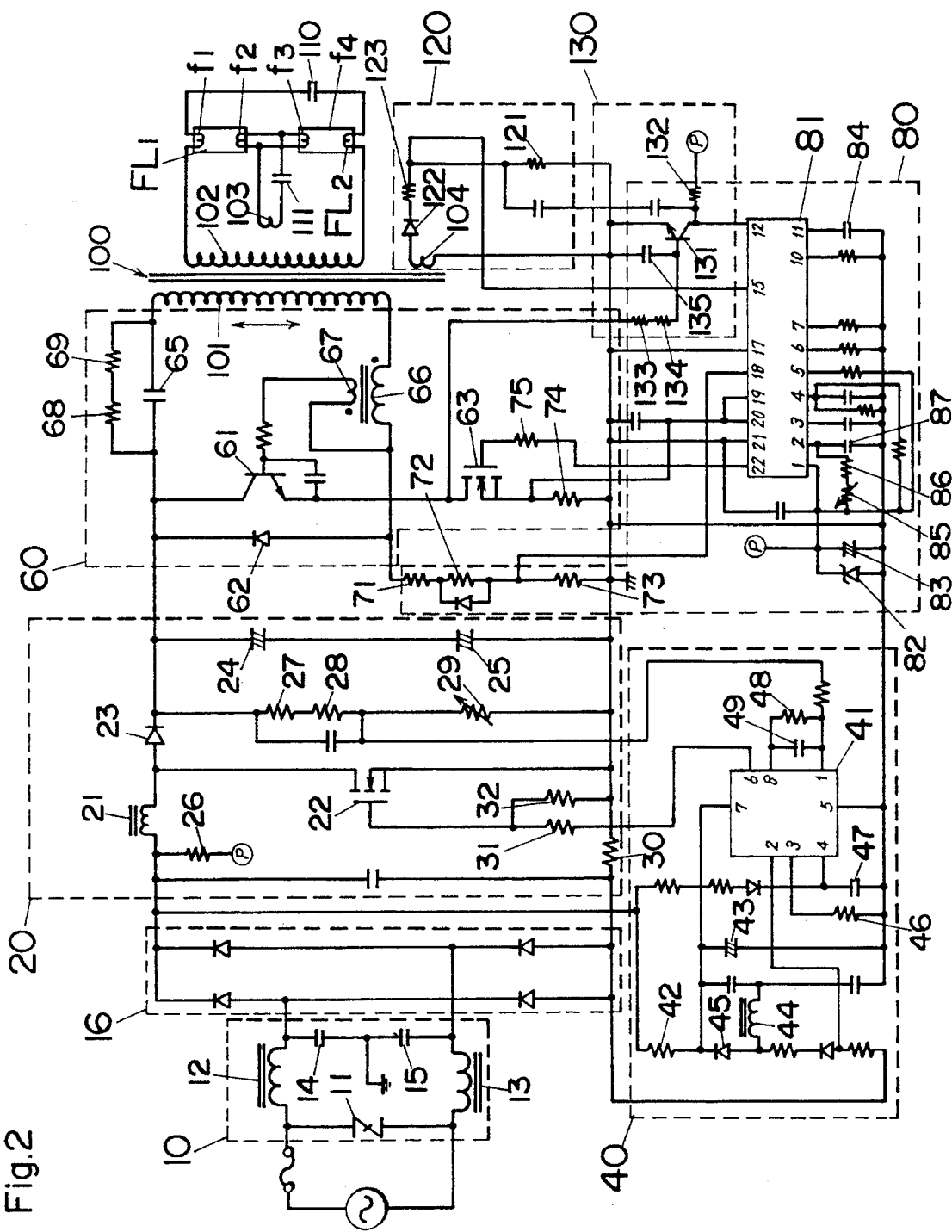
FIG. 2 is a detailed circuit diagram of the power supply in accordance with a first embodiment of the present invention.
Figure 10:
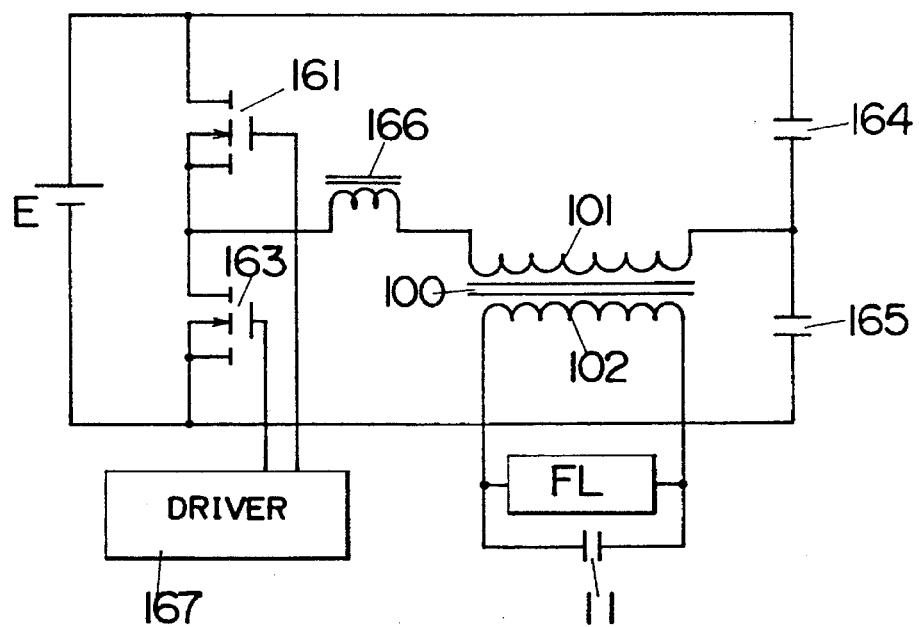
FIGS. 10 to 12 are schematic circuit diagrams illustrating respective modifications of the first embodiment of FIG. 2.
Figure 11:
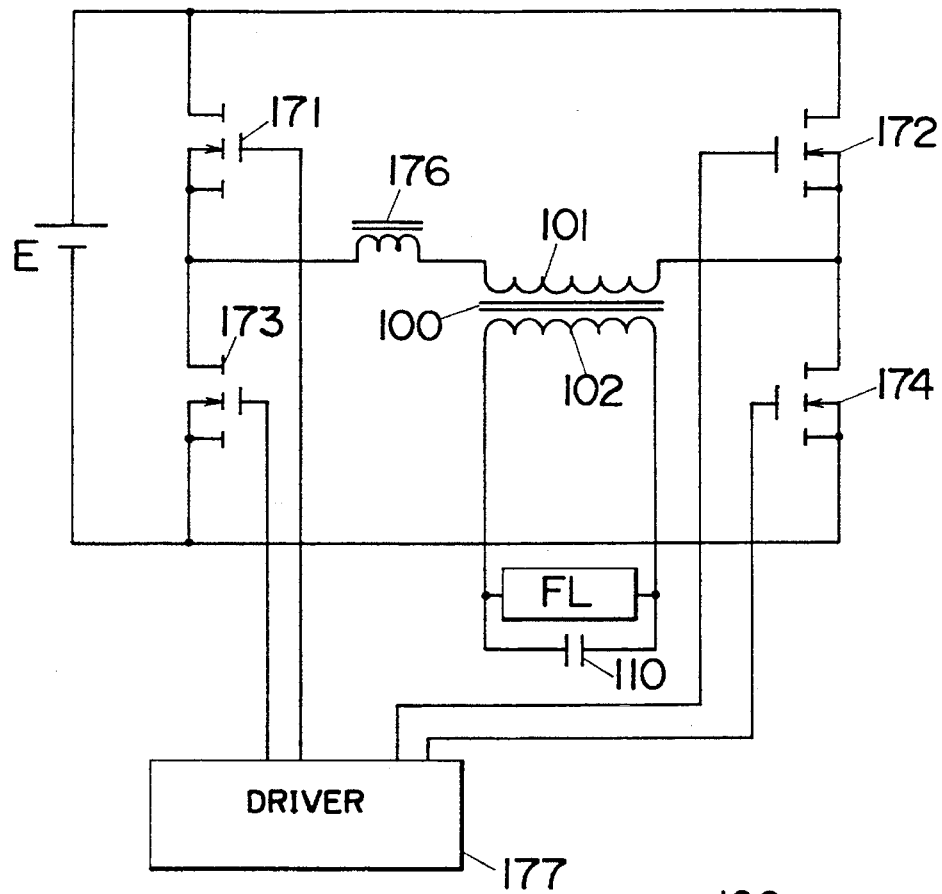
Figure 12:
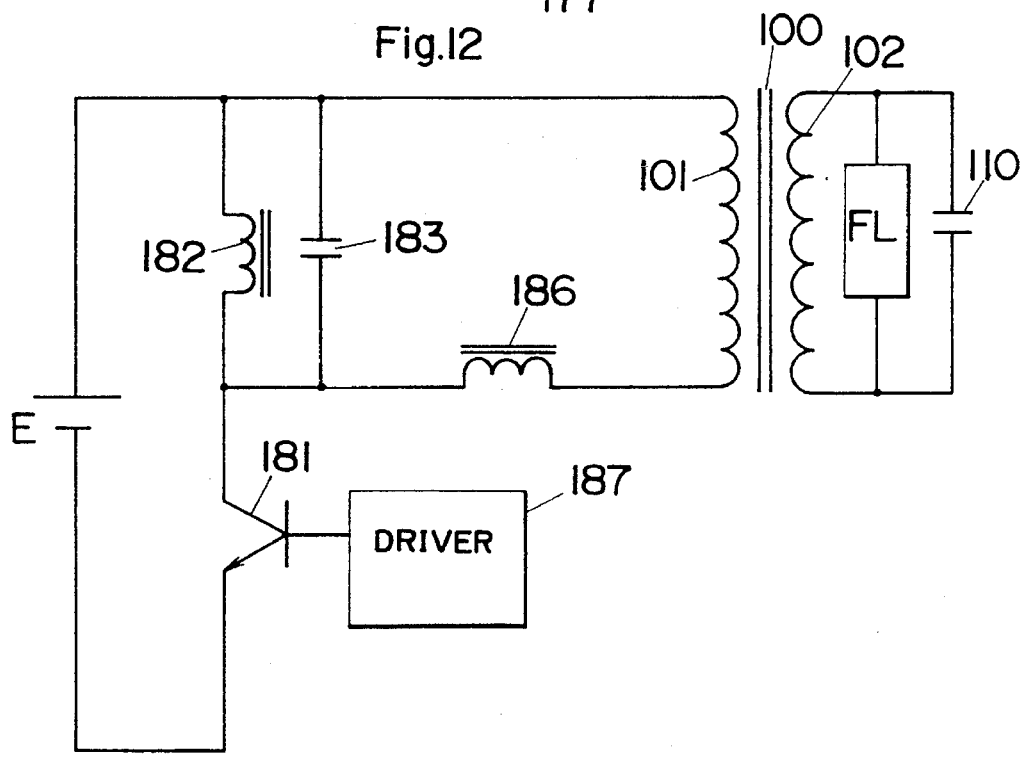

Although the present invention is explained in the above with reference to a specific circuit arrangement of FIG. 2 which is referred generally to as the power supply of a series inverter configuration, the present invention should not be limited to the above specific circuit configuration and could be equally applied to a half-bridge inverter of FIG. 10, a one-transistor inverter of FIG. 11, and a full-bridge inverter of FIG. 12. In these figures like components are designated by like numerals for the purpose of simplicity.

In the modification of FIG. 10, a series pair of FETs 161 and 163 are connected across a DC voltage source E in parallel relation with a series pair of capacitors 164 and 165. The output transformer 100 is arranged in circuit with its primary winding 101 connected in series with inductor 166 between a first juncture of two FETs 161 and 163 and a second juncture of two capacitors 164 and 165. FETs 161 and 163 are controlled by a driver 167 to alternately turn on and off to provide a high frequency voltage to the lamp FL which is connected across the secondary winding 102 in parallel relation to the tuning capacitor 110.

In the modification of FIG. 11, two series pairs of FETs 171 to 174 are connected the DC voltage source E in a full-bridge configuration. The output transformer 100 is arranged in circuit with its primary winding 101 connected in series with inductor 176 between a first juncture of two series connected FETs 171 and 173 and a second juncture of two series connected FETs 172 and 174. A driver 177 is provided to repetitively turn on the two diagonally opposed FETs 171 and 173 simultaneously while turning off the other two diagonally opposed FETs 172 and 174, thus providing a high frequency voltage to the lamp FL which is connected across the secondary winding 102 in parallel relation to the tuning capacitor 110.

In the modification of FIG. 12, a bipolar transistor 181 is connected in series with a parallel L-C circuit of inductor 182 and capacitor 183 across the DC voltage E. The transistor 181 is controlled by a driver 187 to turn on and off at a high frequency so as to provide a corresponding high frequency voltage across the L-C circuit of 182 and 183. The transformer 100 is arranged in circuit with its primary winding 101 connected in series with an inductor 186 across the L-C circuit of 182 and 183. The tuning capacitor 110 is connected across the secondary winding 102 of the transformer 100 in parallel relation to the lamp FL and is cooperative with the inductor 186 to form a series resonant circuit. The resonant circuit responds to the high frequency voltage applied to the primary winding 101 for providing a resonant current to drive the lamp FL. Like inverter operation is equally possible with an alternate circuit arrangement in which the inductor 186 and primary winding 101 are connected across the transistor 181 instead of the parallel combination of capacitor 183 and inductor 184.

SECOND EMBODIMENT <FIGS. 13 TO 16>

Figure 13:
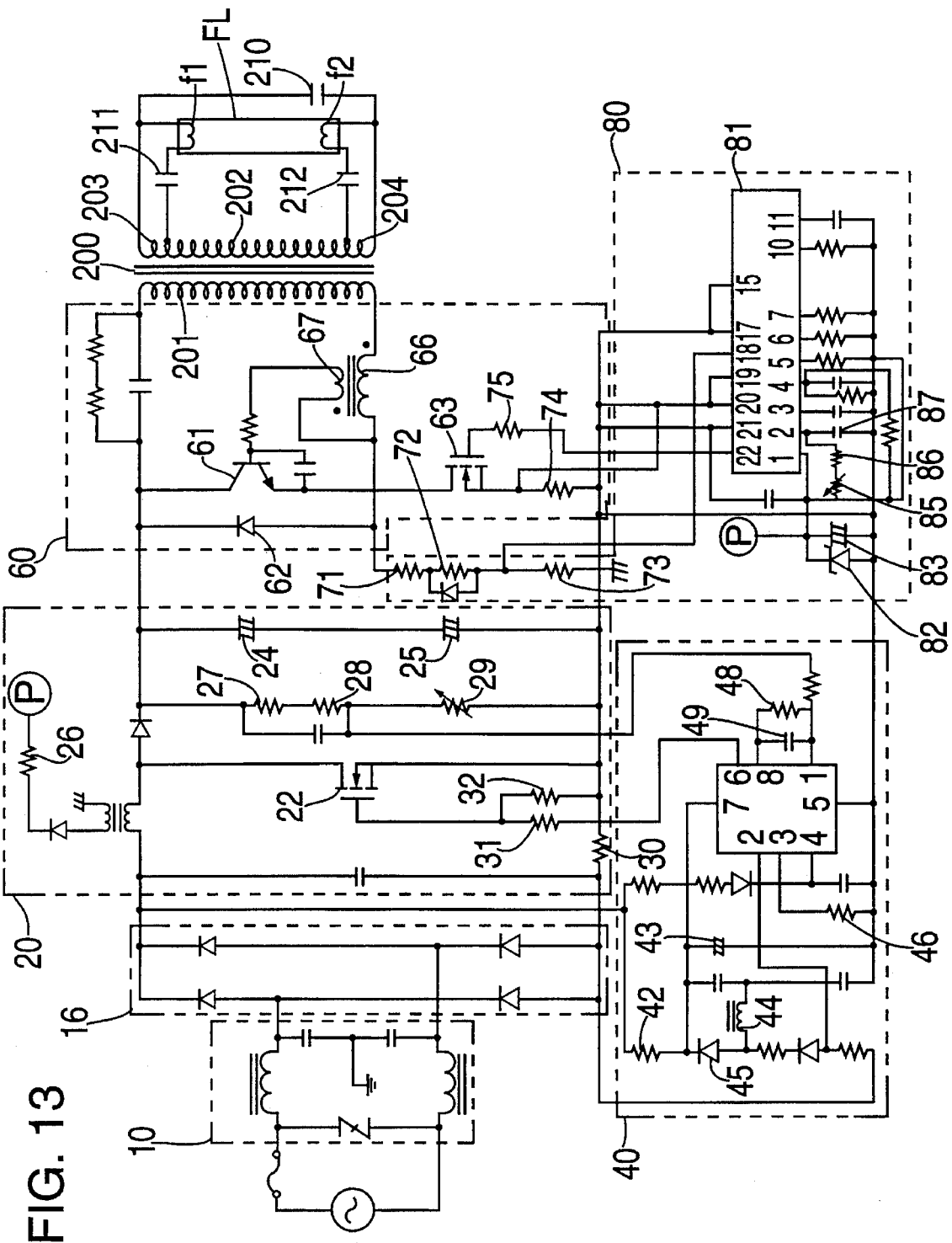
FIG. 13 is a detailed circuit diagram of a power supply in accordance with a second embodiment of the present invention.

FIG. 13 shows an inverter power supply in accordance with a second embodiment of the present invention which is basically identical in circuit configuration and operation to the first embodiment except that an output transformer 200 is connected to drive a single fluorescent lamp FL with filaments $f_1$ and $f_2$. The output transformer 200 includes, in addition to a like primary winding 201, a main secondary winding 202 across which the lamp FL is connected, and two auxiliary secondary windings 203 and 204 which are connected respectively through capacitors 211 and 212 to the filaments $f_1$ and $f_2$ for preheating thereof. A like tuning capacitor 210 is connected through the filaments $f_1$ and $f_2$ across the secondary winding 102 in parallel relation to the lamp FL, and is cooperative with a like inductor 66 on the side of the primary winding 201 to form a like L-C resonant circuit. The inverter power supply of the present invention comprises like low-pass filter 10, full-waver rectifier 16, chopper 20, chopper controller 40, inverter 60, and the chopper controller 80 which are all identical in configurations and operations to the first embodiment. Therefore, like components are designated by like reference numerals.

Figure 14:
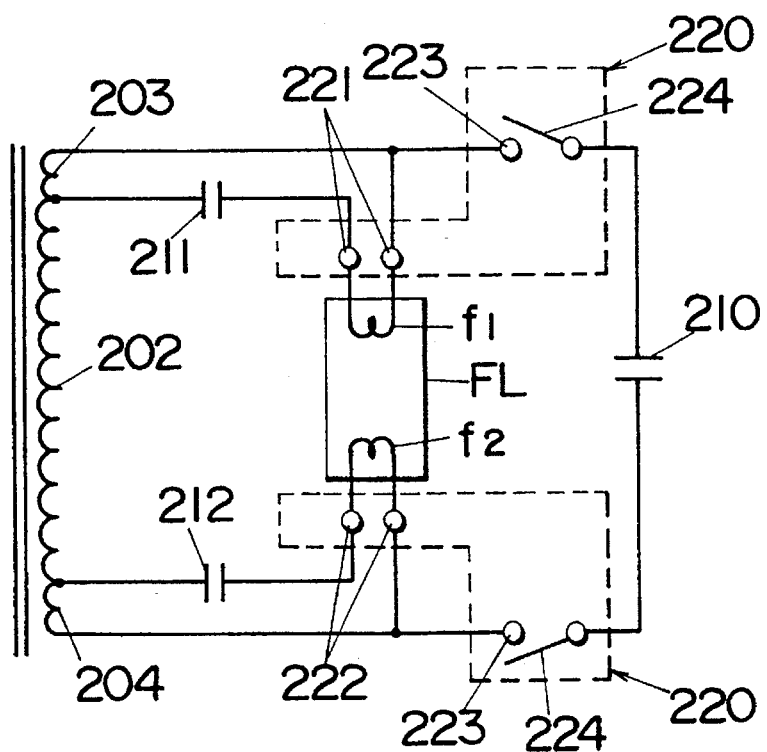
FIG. 14 is a diagram illustrating a pin-receptacle connection between the power supply and a discharge lamp.
Figure 16:
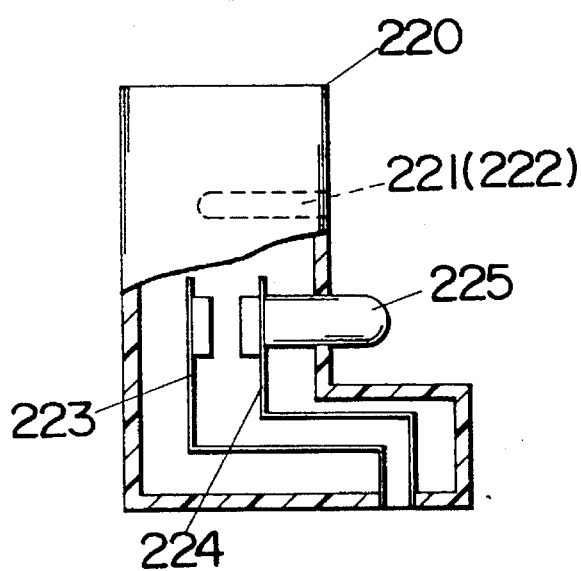
FIGS. 15 and 16 are schematic front view and side sectional view of a receptacle utilized for the pin-receptacle connection of the discharge lamp.
Figure 15:
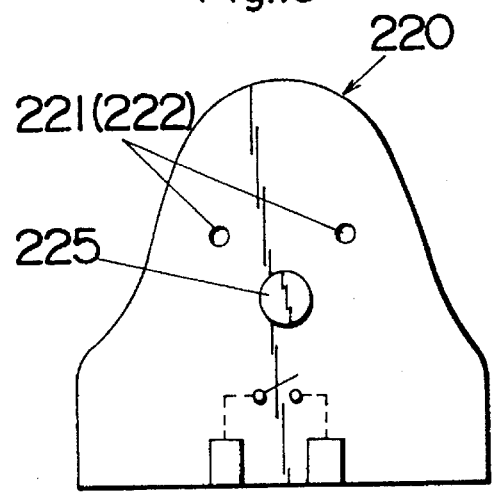

As schematically shown in FIGS. 14 to 16, the present embodiment utilizes a pair of receptacles 220 of unique structure for detachable pin-connection to the lamp FL. The receptacle 220 includes pin-sockets 221 and 222 into which the pins or electrodes of filaments $f_1$ and $f_2$ are inserted for electrical connection thereto. The pin-socket 221 is connected to a common point between the main secondary winding 202 and the adjacent one of the auxiliary secondary windings 203 and 204, while the other pin-socket 222 is connected to the outer end of auxiliary secondary winding 203 and 204. Also included in the receptacle 220 is a switch composed of a fixed contact 223 and a movable contact 224 arranged in circuit between the pin-socket 222 and the tuning capacitor 210. An actuator 225 projects from the movable contact 224 outwardly of the receptacle 220 in abuttable relation against the end of the lamps FL. When the lamp FL is installed to the receptacles 220 with the pins inserted into the pin-sockets 221 and 222, the actuator 225 is pushed inwardly by contact with the lamp end to close the contacts 223 and 224 for establishing the electrical connection of the capacitor 210 to the main secondary winding 202. On the other hand, when the lamp FL is removed, the actuator 225 moves outwardly by a spring bias inherent to the movable spring or other spring means to open the contacts 223 and 224, thus open-circuiting the tuning capacitor 210 and therefore breaking the L-C resonant circuit. The above receptacle can be equally adapted to the first embodiment for successfully disconnecting the tuning capacitor from the output transformer upon removal of the lamp.

THIRD EMBODIMENT <FIGS. 17 AND 18>

Figure 18:
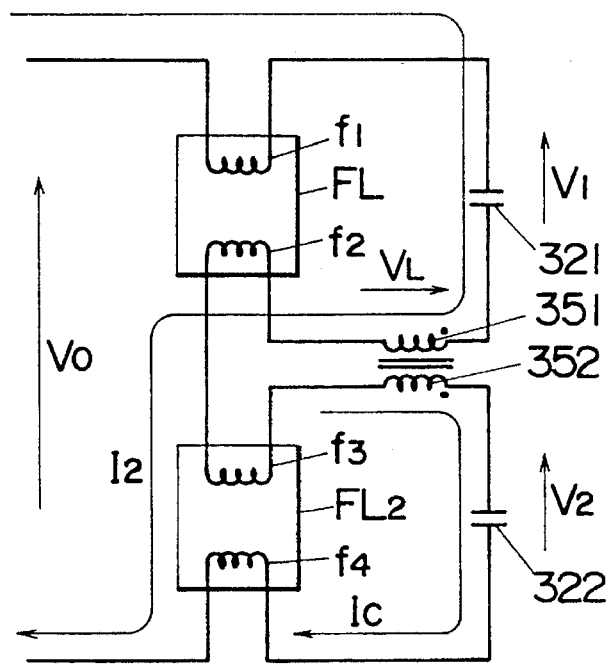
FIG. 18 is a diagram illustrating the operation of the circuit of FIG. 17.

FIG. 18 shows an inverter power supply for driving a series connected pair of fluorescent lamps $FL_1$ and $FL_2$ in accordance with a third embodiment of the present invention. The power supply comprises a series connected pair of bipolar transistors 311 and 313 connected across the DC voltage source E, and a series connected pair of diodes 312 and 314 which are connected in anti-parallel relation to transistors 311 and 313, respectively. An output transformer 300 is provided with its primary winding 301 connected in series with a coupling capacitor 315 and an inductor 316 across the transistor 311. The lamps $FL_1$ and $FL_2$ are connected across the secondary winding 302 of the output transformer 100. Tuning capacitors 321 and 322 are connected across the filaments $f_1$, $f_2$ and $f_3$, $f_3$ of the respective lamps $FL_1$ and $FL_2$ through a balancing choke 350 composed of electromagnetically coupled first and second windings 351 and 352. The tuning capacitors 321 and 322 are cooperative with the inductor 316 on the side of primary winding 301 to form individual L-C resonant circuits for providing resonant currents to the lamps $FL_1$ and $FL_2$, respectively. Also connected across the DC voltage source E is a starter circuit 330 composed of a resistor 331, a capacitor 332, and a diac 333 which is connected to the base of transistor 313 to provide thereto a starting voltage. The inductor 316 are magnetically coupled to first and second windings 341 and 342 which are connected respectively across the base-emitter path of transistors 311 and 313 through resistors 343 and 344. When transistor 313 is firstly turned upon receiving the starting voltage from diac 333, a current is allowed to begin flowing from the DC voltage E through capacitor 315, primary winding 301, inductor 316, and transistor 313, at which condition first winding 341 gives a forward bias to keep transistor 313 turned on while second winding 342 gives a reverse bias to keep transistor 311 turned off. Subsequently when the current is reduced after charging capacitor 315, first winding 341 gives a reverse bias to turn off transistor 313 while at the same time second winding 342 gives a forward bias to turn on transistor 311. With this result, another current is caused to flow through transistor 311, inductor 316 and primary winding 301 in the opposite direction. As this current is reduced, first winding 341 and second winding 342 give the reverse and forward biases respectively to transistors 311 and 313, thereby turning off transistor 311 and turning on transistor 313. In this manner, transistors 311 and 313 are caused to alternately turn on and off for providing a high frequency voltage to the lamps $FL_1$ and $FL_2$ through the output transformer 100 and the L-C resonant circuits for driving the lamps $FL_1$ and $FL_2$. It is noted that the tuning capacitors 321 and 323 also act to preheat the filaments $f_1$ to $f_3$ of the lamps $FL_1$ and $FL_2$ at the start of the operation. Also in this embodiment, upon removal of either of the lamps, the tuning capacitors 321 and 322 are open-circuited to cease the inverter operation for protecting the transistors 311 and 313 from otherwise developed over-voltage.

Operation of the balancing choke 350 is now discussed with reference to FIG. 18. Considering the case in which the power supply provides an overall voltage $V_0$ which is insufficient to start both of the lamps $FL_1$ and $FL_2$ but sufficient to start one of the lamps, there would be a problem in the power supply without the balancing choke 350 that only one of the lamps is allowed to start while the other is not. That is, if the overall voltage $V_0$ is lower than a sum of individual starting voltage $V_1$ and $V_2$ required for the lamps $FL_1$ and $FL_2$ but is higher than one of the individual starting voltage, and when the lamp $FL_2$ is started, for example, the other lamp $FL_1$ would not started due to the shortage of the starting voltage. In this instance, however, the balancing choke 350 allows to flow a lamp current $I_2$ through the first winding 351 and to flow a preheating current $I_c$ through filaments $f_3$ and $f_4$ of lamp $FL_2$ and through second winding 352 and capacitor 322. Since the lamp current $I_2$ is greater than the preheating current $I_c$, the balancing choke 350 induces across the first winding 351 a voltage $V_L$ in the direction as indicated in the figure. Consequently, thus induced voltage $V_L$ is added to a voltage $(1/C)\int I_2 dt$ developed across capacitor 321 so as to apply an increased voltage to lamp $FL_1$ enough to start the same. After both lamps $FL_1$ and $FL_2$ are started, first and second windings 351 and 352 sees preheating currents which are opposite in direction but are of the same intensity such that the induced voltage at the individual windings are canceled to each other to provide no apparent voltage in either of the windings. Therefore, after the start of the lamps $FL_1$ and $FL_2$, the preheating currents are allowed to flow continuously through capacitors 321 and 322 at suitable level determined by capacitances of capacitors 321 and 322.

FOURTH EMBODIMENT <FIG. 19>

Figure 17:
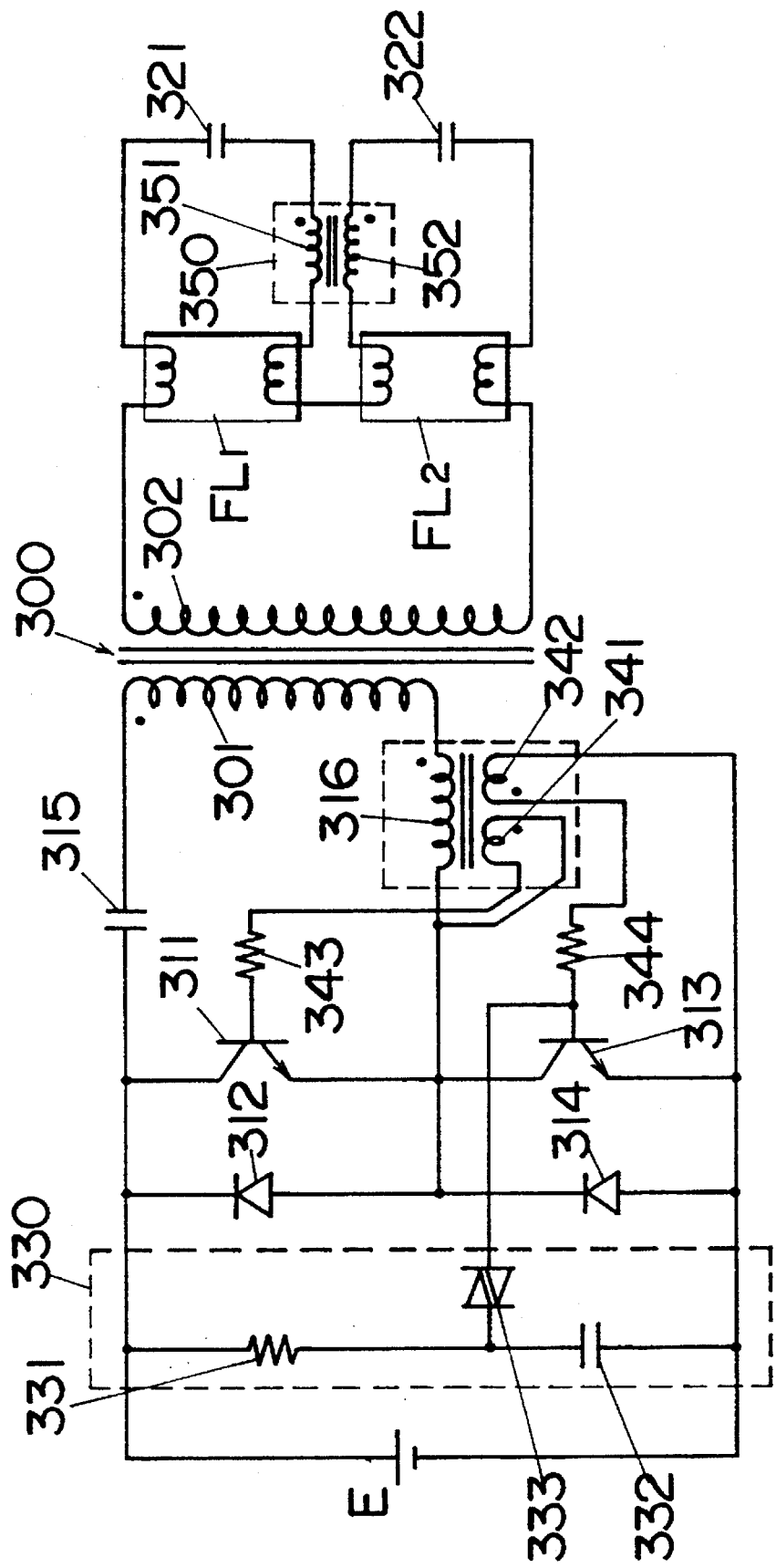
FIG. 17 is a circuit diagram of a power supply in accordance with a third embodiment of the present invention.
Figure 19:
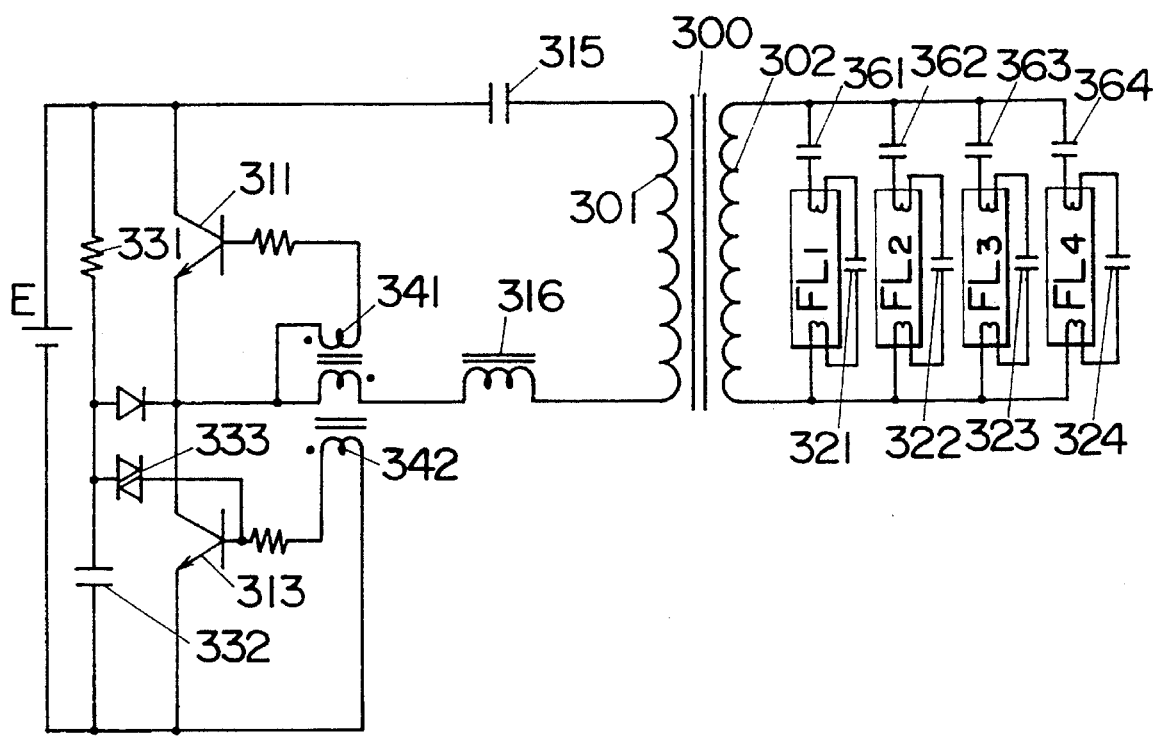
FIG. 19 is a circuit diagram of a power supply in accordance with a fourth embodiment of the present invention.

FIG. 19 shows an inverter power supply in accordance with a fourth embodiment of the present invention. The power supply is intended to drive a plurality of fluorescent lamps $FL_1$ to $FL_4$ connected in parallel relation to each other, and is identical in configuration and operation to the third embodiment of FIG. 17 except for the parallel connection of the plural lamps $FL_1$ across secondary winding 302 of the output transformer 300. Tuning capacitors 321 to 324 are each connected across the filaments of each lamps $FL_1$ to $FL_4$ and connected to the secondary winding 302 respectively through capacitors 361 to 364 which are included for stably driving the lamps. The tuning capacitors 321 to 324 are cooperative with the inductor 316 on the side of the primary winding 301 to form L-C resonant circuits for providing resonant currents thereto.

FIFTH EMBODIMENT <FIG. 20>

Figure 20:
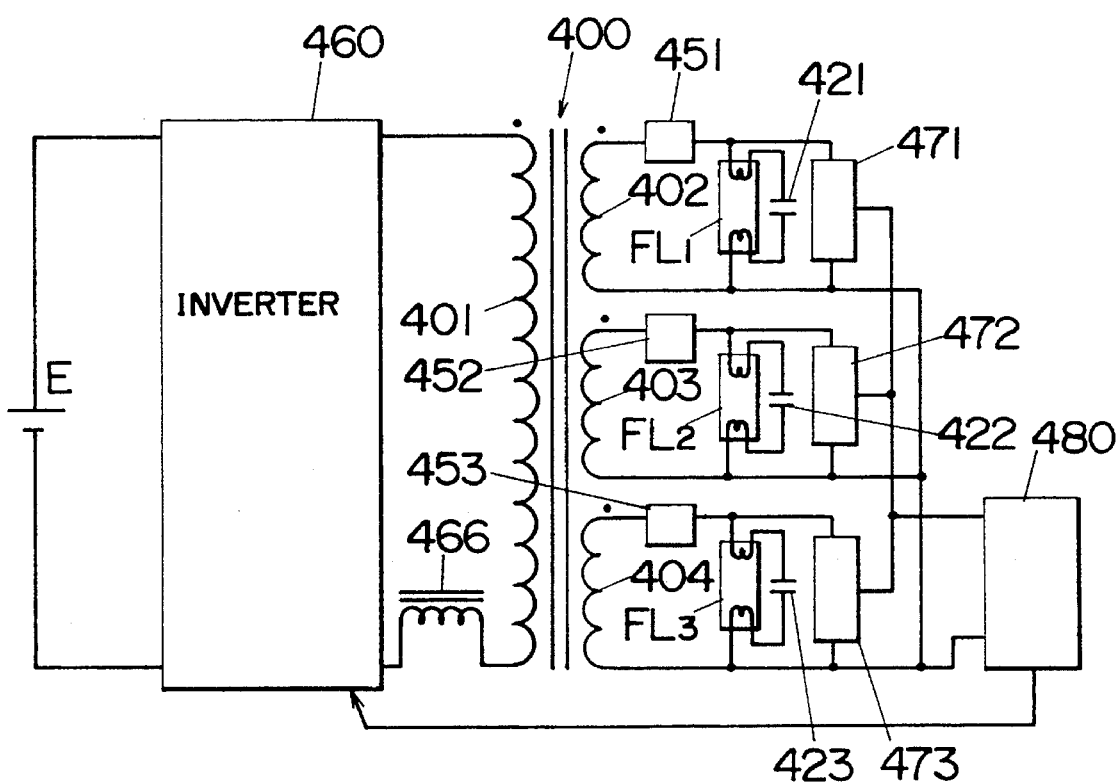
FIG. 20 is a circuit diagram of a power supply in accordance with a fifth embodiment of the present invention.

FIG. 20 shows an inverter power supply for driving a plurality of lamps $FL_1$ to $FL_3$ in accordance with a fifth embodiment of the present invention. The power supply comprises a DC voltage source E, an inverter 460, and an output transformer 400 having a primary winding and a plurality of secondary windings 402 to 404. The inverter 460 may be any one of those as disclosed hereinbefore or any other one capable of providing a high frequency voltage to the output transformer 400. The plural secondary windings 402 to 404 are coupled to have a common line which defines a reference voltage common to the lamps $FL_1$ to $FL_3$ which are connected across the individual secondary windings 402 to 404 through current limiting elements 451 to 453, respectively. Tuning capacitors 421 to 423 are connected across the filaments of the lamps $FL_1$ to $FL_3$, respectively and are connected through the filaments across the individual secondary windings 402 to 404 in parallel relation to the lamps $FL_1$ to $FL_3$, respectively. These tuning capacitors 421 to 423 are cooperative with an inductor 466 to form L-C resonant circuits which, in response to the high frequency voltage from the inverter 460, provide resonant currents to drive the individual lamps $FL_1$ to $FL_3$. The current limiting elements 451 to 453 are provided to enable the starting the lamps one by one for improved starting performance as well as to stably operating the lamps after starting. It is noted here that lamps of different consuming powers can be operated simultaneously with the above power supply simply by altering the turn ratios of the secondary windings 402 to 404, reactance of the current limiting elements 451 to 453, and capacitance of capacitors 421 to 423, either alone or in combination.

Also included in the power supply are voltage detectors 471 to 473 each connected across each of the lamps $FL_1$ to $FL_3$ to monitor the voltage being supplied thereto and generate an alarm signal when the monitored voltage exceeds a predetermined level. The alarm signal, which is indicative of that an abnormal over-voltage is applied to the lamp, is fed in the form of a voltage signal to a controller 480 which responds to limit or cease the operation of the inverter for eliminating the over-voltage. It should be noted here that since the secondary windings 402 to 404 are coupled to the common line, the individual voltage detectors 411 to 413 can be also connected to the common line to have the common reference voltage so that the alarm signals from the individual detectors 471 to 473 are made consistent, which makes it possible to share only one controller for the individual detectors 471 to 473. Even if the lamps of different operating characteristics are required to operate together, it is still possible to use only one controller 480 simply by altering the component settings of at least one of the detectors.

What is claimed is:

1. A power supply comprising:

a DC voltage source;

inverter means connected to said DC voltage source for providing a high frequency AC voltage at its output end;

output transformer means having a primary winding coupled to the output end of said inverter means through tuning inductor means and a secondary winding with at least one load connected across the secondary winding;

tuning capacitor means connected across said secondary winding of said output transformer in parallel relation to said load and cooperative with said tuning inductor means to form a resonant circuit which produces a resonance current for driving said load, said tuning capacitor means being connected in circuit on the opposite side of said secondary winding from said load such that said tuning capacitor is open-circuited when the load is disconnected from said secondary winding.

2. A power supply as set forth in claim 1, wherein said inverter means comprises:
   a pair of series-connected switching elements connected across said DC source and driven to alternately turn on and off at a high frequency, said switching elements defining therebetween a first point of connection; and
   a pair of series-connected capacitors connected across said DC source and defining therebetween a second point of connection;
   said tuning inductor connected in series with said primary winding of said output transformer between said first and second points of connection.

3. A power supply as set forth in claim 1, wherein said inverter means comprises:
   a pair of series-connected switching elements connected across said DC source and driven to alternately turn on and off at a high frequency;
   said tuning inductor connected in series with said primary winding of said output transformer across one of said switching elements.

4. A power supply as set forth in claim 1, wherein said inverter means comprises:
   a first pair of series-connected switching elements connected across said DC source and driven to alternately turn on and off at a high frequency, said switching elements defining therebetween a first point of connection; and
   a second pair of series-connected switching elements connected across said DC source so as to form a bridge with said first pair of the switching elements, said second pair of the switching elements driven to alternately turn on and off at a high frequency in such a manner that diagonally opposed pairs of said switching elements in said bridge are simultaneously turned on and off, said switching elements in said second pair defining therebetween a second point of connection;
   said tuning inductor connected in series with said primary winding of said output transformer between said first and second points of connection.

5. A power supply as set forth in claim 1, wherein said inverter means comprises:
   a pair of series-connected reactance means and switching element connected across said DC source, said switching element driven to turn on and off at a high frequency;
   said tuning inductor connected in series with said primary winding of said output transformer across one of said reactance means and said switching element.

6. A power supply as set forth in claim 5, wherein said reactance means comprises a parallel combination of an inductor and a capacitor, and said tuning inductor and said primary winding being connected across said parallel combination of the inductor and the capacitor.

7. A power supply as set forth in claim 1, wherein said load is a gas discharge lamp having a pair of filaments through which said tuning capacitor is connected across said secondary winding of said output transformer.

8. A power supply as set forth in claim 1, further comprising load detector means detecting condition of the load in terms of the voltage being supplied to said load through said output transformer, and control means which monitors said voltage and causes said inverter means to limits its output voltage being supplied to said load through said output transformer when said monitored voltage exceeds a critical level.

9. A power supply as set forth in claim 1, wherein said load is a gas-discharge lamp having a pair of filaments with connecting pins to be inserted into corresponding receptacles for electrical connection to said secondary winding of said output transformer, and wherein switch means is provided to comprise at least one switch connected in circuit between one of said filaments and said tuning capacitor and an actuator which is interlocked with said switch and projects on said receptacle to be movable between a closed circuit position of connecting said tuning capacitor to said secondary winding through said filament and an open circuit position of disconnecting said tuning capacitor from said secondary winding, said switch being accommodated within a housing of said receptacle with said actuator projecting in an abuttable relation to said discharge lamp such that said actuator abuts against said discharge lamp to be thereby moved into said open circuit position when said discharge lamp is mounted to said receptacle.

10. A power supply as set forth in claim 1, further comprising:
    load detector means detecting whether said load is kept connected to or disconnected from said output transformer and producing a disable signal when said load is disconnected and producing an enable signal when said load is connected to said output transformer; and
    control means which disables said inverter means in response to said disable signal and enables said inverter means in response to said enable signal.

11. A power supply for driving a plurality of gas-discharge lamps, said power supply comprising:
    a DC voltage source;
    inverter means connected to said DC voltage source for providing a high frequency AC voltage at its output end;
    output transformer means having a primary winding coupled to the output end of said inverter means through tuning inductor means and a secondary winding with a plurality of gas discharge lamps connected across the secondary winding;
    a plurality of tuning capacitors connected across said secondary winding of said output transformer in parallel relation to said respective gas-discharge lamps and cooperative with said tuning inductor means to form resonant circuits which produce a resonance current for driving said gas-discharge lamps, said tuning capacitors being connected in circuit on the opposite side of said secondary winding from said gas-discharge lamps such that said tuning capacitor is open-circuited when any one of said corresponding gas-discharge lamps is disconnected from said secondary winding; and
    balancing choke coil means having a primary winding which is connected in series between one of two said adjacent tuning capacitors and corresponding one of said discharge lamps, and a secondary winding which is connected in series between the other of two said adjacent tuning capacitors and corresponding one of said discharge lamps, said primary and secondary windings of said balancing choke coil means having opposed polarity for equalizing the currents flowing through said adjacent two tuning capacitors.

12. A power supply comprising:
    a DC voltage source;
    inverter means connected to said DC voltage source for providing a high frequency AC voltage at its output end;
    output transformer means having a primary winding coupled to the output end of said inverter means through tuning inductor means and a secondary winding with a plurality of loads connected across the secondary winding;

a plurality of tuning capacitors connected across said secondary winding of said output transformer in parallel relation to said respective loads and cooperative with said tuning inductor means to form resonant circuits which produce a resonance current for driving said loads, said tuning capacitors being connected in circuit on the opposite side of said secondary winding from said loads such that said tuning capacitor is open-circuited when the corresponding load is disconnected from said secondary winding.

13. A power supply as set forth in claim 12, wherein said load is a gas discharge lamp having a pair of filaments through which corresponding one of said tuning capacitors is connected across said secondary winding of said output transformer.

14. A power supply for driving a plurality of discharge lamps comprising:

a DC voltage source;

inverter means connected to said DC voltage source for providing a high frequency AC voltage at its output end;

output transformer means having a primary winding coupled to the output, end of said inverter means through tuning inductor means and a plurality of secondary windings, with a plurality of discharge lamps, each having two filaments, connected respectively across the secondary windings;

a plurality of tuning capacitors connected across said secondary windings of said output transformer, respectively in parallel relation to corresponding one of said discharge lamps with each tuning capacitor connected across said two filaments of each discharge lamp, each of said tuning capacitors cooperative with said tuning inductor means to form a resonant circuit which produces a resonance current for driving the corresponding discharge lamp; and each of said tuning capacitors being connected across each of said secondary windings through the filaments of each lamp such that said tuning capacitor is open-circuited when the corresponding discharge lamp is disconnected from said secondary winding;

each of said discharge lamps being connected in series with a current limiting element across each of said secondary windings.

15. A power supply as set forth in claim 14, including a plurality of voltage detectors connected respectively across said discharge lamps for detecting voltages applied to the corresponding lamps, and further including safe means which monitors the detected voltages and controls said inverter to decrease its output voltage when the detected voltage in any one of the voltage detectors exceeds an acceptable level.

16. A power supply as set forth in claim 15, wherein said discharge lamps are connected such that one of the two filaments of the individual discharge lamps are commonly connected to a common line, and said safety means having two inputs one of which is connected to said common line.

* * * * *